US012715166B2

(12) United States Patent
Anghileri et al.

(10) Patent No.: US 12,715,166 B2
(45) Date of Patent: Aug. 25, 2026

(54) BIODEGRADABLE BIOCOMPOSITE AND A PROCESS FOR ITS PREPARATION

(71) Applicants: FONDAZIONE ISTITUTO ITALIANO DI TECNOLOGIA, Genoa (IT); NOVACART S.P.A., Garbagnate Monastero (IT)

(72) Inventors: Gianmario Anghileri, Malgrate (IT); Athanasia Athanasiou, Ceranesi (IT); Ilker Bayer, Genoa (IT); Roberto Cingolani, Arnesano (IT); Alexander Jerome Davis, Genoa (IT); Maria Erminia Genovese, Milazzo (IT); Michele Gerosa, Bosisio Parini (IT); Malena Esther Oliveros, Milan (IT); Uttam Chandra Paul, Genoa (IT); Anshu Anjali Singh, Noida (IN)

(73) Assignees: FONDAZIONE ISTITUTO ITALIANO DI TECNOLOGIA, Genoa (IT); NOVACART S.P.A., Garbagnate Monastero (IT)

( * ) Notice: Subject to any disclaimer, the term of this patent is extended or adjusted under 35 U.S.C. 154(b) by 717 days.

(21) Appl. No.: 17/633,998

(22) PCT Filed: Aug. 10, 2020

(86) PCT No.: PCT/IB2020/057509

§ 371 (c)(1),
(2) Date: Feb. 9, 2022

(87) PCT Pub. No.: WO2021/028816

PCT Pub. Date: Feb. 18, 2021

(65) Prior Publication Data

US 2022/0314515 A1 Oct. 6, 2022

(30) Foreign Application Priority Data

Aug. 12, 2019 (IT) ........................ 102019000014658

(51) Int. Cl.
*B29C 48/00* (2019.01)
*C08L 1/02* (2006.01)
(Continued)

(52) U.S. Cl.
CPC ........ *B29C 48/022* (2019.02); *B29C 48/0011* (2019.02); *C08L 1/02* (2013.01);
(Continued)

(58) Field of Classification Search
CPC ........ B29K 2001/08; B29K 2105/0076; B29C 48/022
See application file for complete search history.

(56) References Cited

U.S. PATENT DOCUMENTS 4,834,777 A * 5/1989 Endebrock ............. B30B 11/26
100/324
5,964,933 A 10/1999 Nakamura
(Continued)

FOREIGN PATENT DOCUMENTS

CN 103044871 * 8/2015
DE 102013208876 A1 11/2014
(Continued)

OTHER PUBLICATIONS

CN103044871 machine translation (Year: 2015).*
(Continued)

*Primary Examiner* — Alison L Hindenlang
*Assistant Examiner* — Alexander A Wang
(74) *Attorney, Agent, or Firm* — LUCAS & MERCANTI, LLP

(57) ABSTRACT

The present invention relates to biodegradable composites based on blends of a thermoplastic polymer material with cellulosic materials, useful for several industrial and packaging applications, in particular for the manufacture of biodegradable films and articles of complex shape, having
(Continued)

improved mechanical properties, oxygen barrier properties, biodegradation and heat resistance; and to a process for the manufacture of these biodegradable composites.

18 Claims, 10 Drawing Sheets

(51) Int. Cl.
*B29K 1/00* (2006.01)
*B29K 105/00* (2006.01)

(52) U.S. Cl.
CPC .............. *B29C 2948/92704* (2019.02); *B29K 2001/08* (2013.01); *B29K 2105/0076* (2013.01); *C08L 2201/06* (2013.01)

(56) References Cited

U.S. PATENT DOCUMENTS

| | | | | |
|---|---|---|---|---|
| 6,632,863 | B2 | 10/2003 | Hutchison et al. | |
| 6,730,249 | B2 | 5/2004 | Sears et al. | |
| 2003/0186052 | A1* | 10/2003 | Crews | B29B 7/905 428/375 |
| 2006/0267243 | A1* | 11/2006 | Tindall | B29C 48/04 264/343 |
| 2009/0229771 | A1* | 9/2009 | Warnes | B27N 1/00 162/28 |
| 2011/0020644 | A1* | 1/2011 | Suchomel | C08J 5/047 428/359 |
| 2013/0269546 | A1* | 10/2013 | Sivonen | B30B 3/045 100/118 |
| 2013/0331518 | A1 | 12/2013 | Immonen et al. | |

FOREIGN PATENT DOCUMENTS

| | | | |
|---|---|---|---|
| EP | 0897943 | A2 | 2/1999 |
| EP | 3183288 | B1 | 1/2021 |
| FI | 20106340 | * | 10/2017 |
| JP | 2005014499 | A | 1/2005 |
| JP | 2007260941 | A | 10/2007 |
| JP | 2010089483 | A | 4/2010 |
| JP | 2011152787 | A | 8/2011 |
| WO | 2011144341 | A1 | 11/2011 |
| WO | 2015048589 | A1 | 4/2015 |
| WO | 2019055921 | A2 | 3/2019 |

OTHER PUBLICATIONS

Huda et al., ""Green" composites from recycled cellulose and poly(lactic acid): Physico-mechanical and morphological properties evaluation", Journal of Materials Science, 2005, vol. 40, No. 16, pp. 4221-4229.

International Search Report and Written Opinion for Corresponding International Application No. PCT/IB2020/057509. 11 pages, Dec. 10, 2020.

* cited by examiner

BIODEGRADABLE BIOCOMPOSITE AND A PROCESS FOR ITS PREPARATION

CROSS-REFERENCE TO RELATED APPLICATIONS

This application is a 371 of PCT/IB2020/057509, filed Aug. 10, 2020, which claims the benefit of Italian Patent Application No. 102019000014658, filed Aug. 12, 2019.

FIELD OF THE INVENTION

The present invention relates to the field of composite materials, useful for several industrial applications, and in particular, it refers to a biodegradable composite obtainable by a process for its preparation, which is also part of this invention, and to its use for several industrial and packaging applications. The present composite materials are useful in particular for preparing biodegradable films and articles of complex shape, having improved mechanical and oxygen-barrier properties, biodegradation and heat resistance.

STATE OF THE ART

Biodegradable composites obtained from renewable sources, which can be processed by the standard industrial methods used for the thermoplastics, such as melt extrusion and injection moulding, are emerging as environmentally sustainable alternatives to their petroleum-based counterparts in the fields of automotive, packaging and consumer goods in general.

Among suitable materials of natural origin, paper is the most inexpensive and ubiquitary as it can be directly obtained from the cellulose deriving from agricultural and forestry sources, as well as from the cellulose recovered from the waste production of the packaging industry and from other paper-recycling processes. Moreover, paper is lightweight, mechanically strong and undergoes fast biodegradation.

Among bio-based thermoplastic polymer matrices, polylactic acid (PLA) is a thermoplastic aliphatic polyester that dominates the market of the biodegradable bioplastics due to its mechanical strength, versatile processability, high production capability, biodegradability and biocompatibility combined to its superior sustainability in terms of energy consumption, environmental impact and life-cycle compared to polyolefins [1]. The incorporation of paper in a bio-based matrix, like PLA, not only would be environmentally and commercially attractive but, as observed with other cellulosic fillers, it would also impart an added value to the resulting biocomposites by enhancing important properties, such as impermeability to oxygen, heat resistance and biodegradation rate [1, 2, 3].

Despite such tremendous potential application, the availability of paper/bio-based thermoplastic blends on the market is restricted by the absence of efficient industrially scalable processing methods based on melt compounding, such as extrusion or injection moulding. Moreover, previous studies and patent applications have disclosed technological innovations regarding the melt processing of natural fibres, ligno-cellulosic biomasses and micro-/nano-crystalline fillers (German Patent No. 102013208876A1, EP Patent No. 3183288A1, [4]) that require complicated processes to be isolated, rather than paper, and far less attention has been devoted to the promotion of waste paper and cardboard. For example, Huda et al. [3] have combined up to 40% by weight of recycled cellulose fibres from newspapers with PLA in a micro-compounding apparatus, but the process was not investigated on a larger scale to assess its potential applicability in industry. In addition, as no compatibilizer was used, the tensile strength and the impact strength of the obtained materials sensibly decreased with increasing fiber content due to agglomeration. JP Patent No. 2011152787A features a method to fabricate PLA/cellulose flexible moulded articles from different cellulosic raw materials including cardboard and wastepaper through extrusion at 170-220° C. followed by injection moulding. However, the patentees report that the cellulosic component had to be subjected to long sequential pulverization steps for up to 50 hours at 5-250° C., and the addition of stabilizing agents up to 1:1 ratio with respect to paper was necessary in order to obtain a formulation suitable for the extrusion process.

The U.S. Pat. No. 5,964,933 describes an extrusion process for the preparation of a biodegradable composite starting from polylactic acid and paper powder. The International patent application published with No. WO 2015/048589 and the European patent application No. EP0897943 also describe a process for preparing composites based on polylactic acid and micro-ground or respectively micronized cellulose.

The most important challenges, so far unsolved, with regard to the processing of paper/thermoplastic polymers blends, through melt extrusion, include: 1) the non-homogeneous dispersion of paper in the polymeric matrices, due to its agglomeration arising from the low compatibility with the hydrophobic polymer, 2) the non-continuous feeding into the extruder, and 3) the need for an effective stabilization in the polymer matrix, against thermal and oxidative degradation of the paper at the temperatures used for the processing, which for example are around 180-200° C. for PLA [5]. The poor interfacial adhesion between paper and the thermoplastic matrix and the heat sensitivity of paper strongly undermine the structural and aesthetical characteristics of the final composites inducing a weakening in the stiffness and tensile strength as well as giving rise to off-odours and burned coloration.

Disclosed in the patent and scientific literature are methods for improving the dispersibility of cellulosic materials and allowing their feeding in the extruder, by granulation through physical methods, such as roll-milling and blade cutting [6]. Other conventional methods include mechanical grinding and subsequent palletisation using water, lubricants, surfactants or softening agents (JP Patent No. 2007260941A, U.S. Pat. No. 6,730,249B2) or compacting moistened cellulose fibres through compression moulding (JP Patent No. 2005014499A). Yet another widely used approach is the pre-mixing with the thermoplastic polymer in the molten state for typically 10 or more minutes prior to the extrusion (JP Patent No. 2010089483A, WO Patent No. 2011144341A1). However, the cutting/pulverization operations drastically reduce the fibres' length and their reinforcement potential, the extensive moisturization or hydration and dehydration cycles result in an irreversible aggregation of the fibres upon drying [7], whereas the kneading at high temperatures can lead to the degradation of both the polymer matrix and of the cellulosic components.

Another aspect concerns the compatibilization with the polymer matrix through the addition of high amounts of reactive compatibilizers, coupling agents, grafting and the like. These conventional methods require the use of non-environmental friendly solvents and treatments and non-biodegradable or harmful additives that release toxic volatile components. On the top, they can be effective on high purity cellulose with big surface to volume ratio (i.e. microfibrillated and nanocrystalline cellulose) rather than bulk paper materials. To obtain such cellulose, expensive and time-consuming treatment of the cellulose pulp is required, like enzymatic, acid or mechanical shearing. In U.S. Pat. No. 6,632,863B2 cellulosic materials, including paper (35-70% by weight) are processed with the synthetic, non-biodegradable polyethylene at temperatures ranging from 170 to 190° C., and a high concentration of additives, up to 45% by weight of the formulation, was required for the processing. Moreover, said additives also included toxic lead and cadmium metals used as stabilizers.

US Patent No. 20130331518A1 discloses a method for the compatibilization of cellulose fibres with PLA using long-chained organic compounds containing epoxy or anhydride functionalities. In the final material, despite the use of the compatibilizer, the amount of cellulose fibres did not exceed 30% by weight of the total composition, while the interfacial adhesion between matrix and filler remained poor, as in some examples a decrease by 50% was reported in the tensile strength and elongation at break. Even in greener approaches based on water soluble coupling agents and co-polymers, the high water content resulted in prolonged drying times that would not be industrially and energetically sustainable.

For example, in U.S. Pat. No. 6,730,249B2, 60-70% by weight of moisture was used to treat cellulose pulp with sodium carboxymethyl cellulose and a softening agent followed by drying at 90° C. overnight. According to [8], cellulosic fibres were suspended in water with a concentration of 1% by weight prior to the compatibilization and then spray dried at 200° C. and further dried under vacuum at 75° C. overnight. Furthermore, the practical efficacy of the disclosed processes is not sufficiently demonstrated as the properties of the obtained composites are either scarcely investigated or inferior compared the pure polymer.

Finally, a crucial problem, especially felt for the paper-based composites, is the extrusion temperature of paper in thermoplastics blends, typically ranging from 180 to 240° C. as reported in the abovementioned examples, which triggers thermal and oxidative degradations, resulting in darkening and poor mechanical properties.

The International patent application No. WO2019055921A2 discloses a composite material, which includes a thermoplastic polymer matrix wherein cellulose pulp and filler material are dispersed. The composite may be in solid form (pellets) or molten form. A method for moulding a part includes providing a solid composite that includes thermoplastic polymer, filler material and cellulose pulp fibres to an injection moulding system. In these composites, a great percentage of filler is present.

Improvements in the formulation and compatibilization of paper-based materials in thermoplastic compositions are still needed to render them suitable for melt processing, in particular melt extrusion. At the same time, a green and sustainable approach should be adopted, combined with a rigorous validation of the proposed fabrication method through the assessment of the composites physical-chemical properties in view of their potential applications in food, toys and similar.

SUMMARY OF THE INVENTION

Now the inventors have found a continuous and automatable process for the manufacture of biodegradable biocomposites by melt extrusion, wherein these composites comprise high loadings of paper from compressed pulp or treated paper, recycled paper, waste paper or cardboard from the packaging industry, and biodegradable thermoplastic polymers, such as PLA, used alone or in combination with other polyesters.

It is yet another scope of this invention to easily process the thermoplastic blends at temperatures below 180° C., in order to prevent paper degradation and discoloration, producing uniform extruded strands with a smooth surface, light colour and rheological properties that allow further melt processing in order to obtain items/objects even of complex shape.

It is another subject of this invention to compatibilize paper capsules with hydrophobic polymer matrices and to stabilize them against oxidative and thermal degradation by means of eco-friendly and sustainable solutions using non-toxic and food contact approved additives in a limited weight ratio compared to the total weight of the material. All these, in the absence of organic solvents and using a limited amount of water to avoid prolonged drying times before extrusion.

It is another subject of this invention to develop a straightforward method to obtain compact paper capsules from commercially available paper and cardboard as well as from recycled paper and wastepaper in a suitable size for proper mixing with the thermoplastic polymer material and feeding in the extruder in a dry form without reducing the fibres length.

It is a further subject of this invention to manufacture items from the extruded biocomposites by means of injection and compression moulding that exhibit improved mechanical and oxygen barrier properties, heat resistance and biodegradability, suitable for a number of industrial and packaging applications, especially suitable for food packaging.

Subject of the present invention is therefore a process for the preparation of biodegradable biocomposites as claimed in claim 1, that solves the technical problems highlighted above for the known processes, providing a homogeneous dispersion of paper in the polymeric matrix, excellent resistance of the paper to oxidative and thermal degradation of the paper during processing.

A further subject of the present invention is a biodegradable biocomposite obtainable by the above said process, its use and a moulded article.

Further important characteristics of the subjects of this invention are defined in the dependent claims.

BRIEF DESCRIPTION OF THE FIGURES

The characteristics and advantages of the biodegradable biocomposite and the process for its preparation according to the present invention, will be clearly illustrated in the following exemplary and not limiting description of their embodiments, also with reference to the attached figures wherein.

Figures 5, 6:
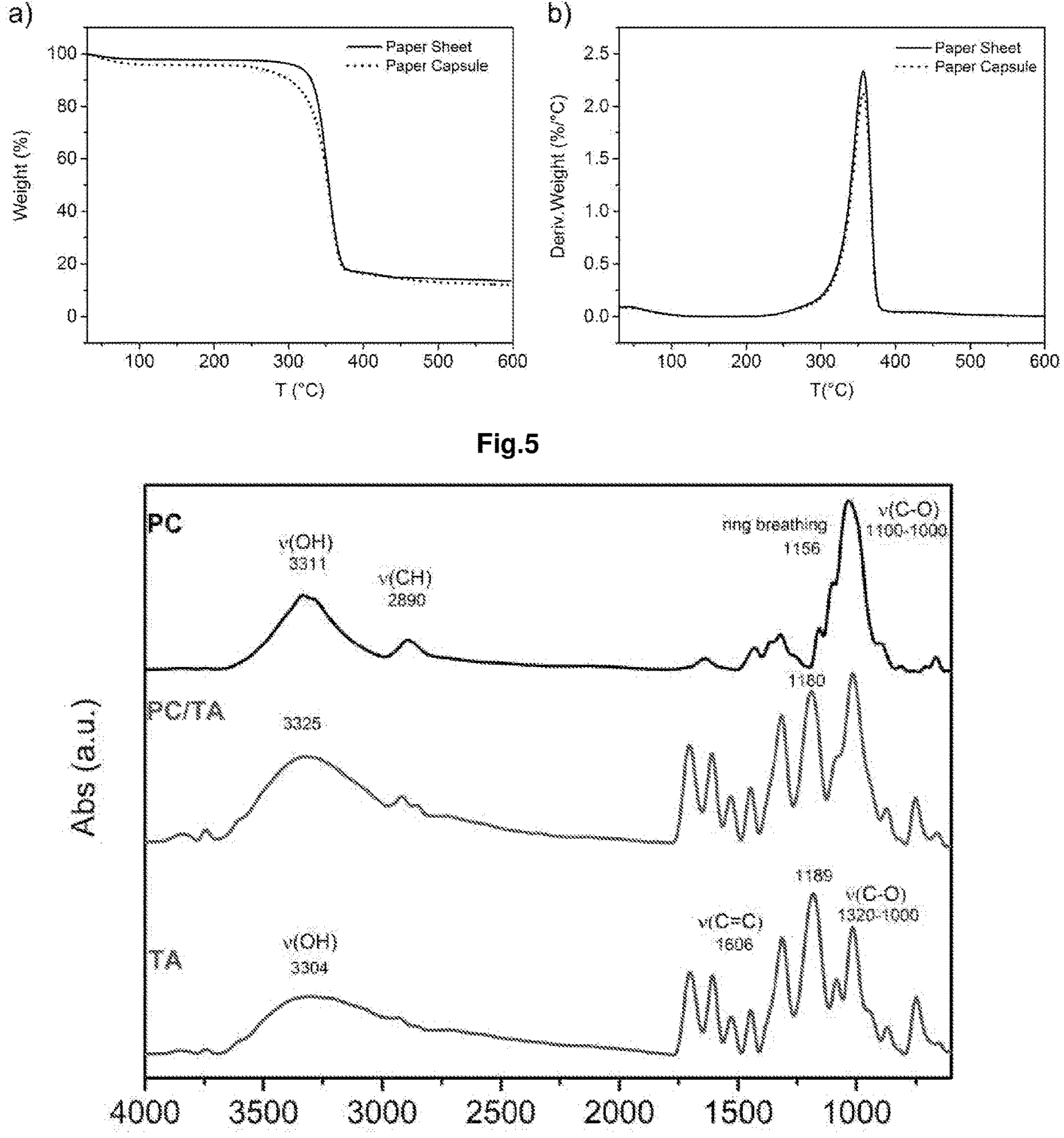
FIG. 5 shows the thermogravimetric analysis (TGA) profiles (FIG. 5*a*) and corresponding first derivative (FIG.
Figure 7:
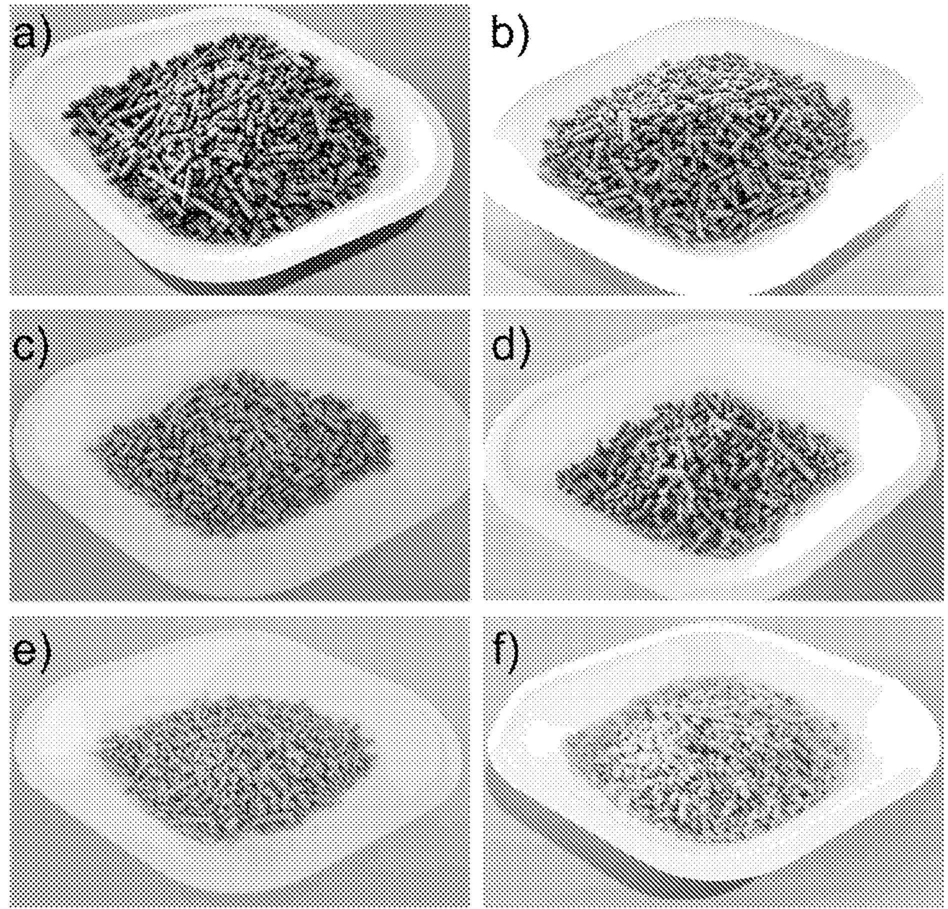
Figure 8:
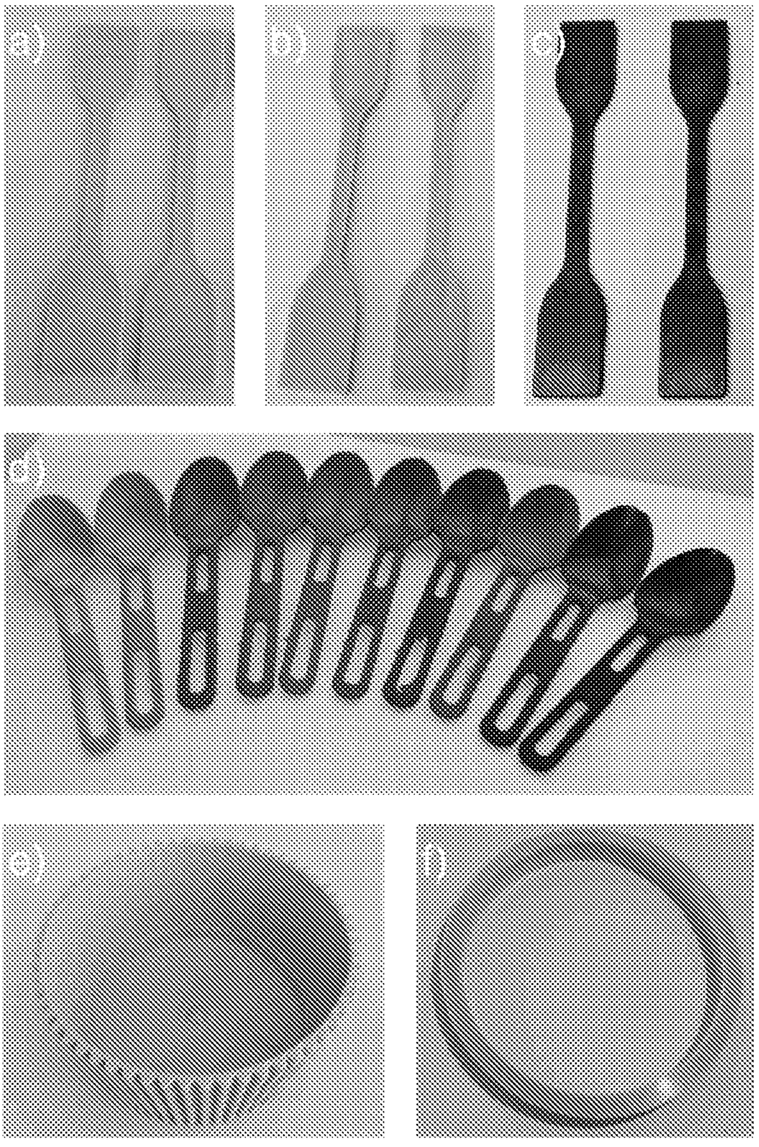
Figure 9:
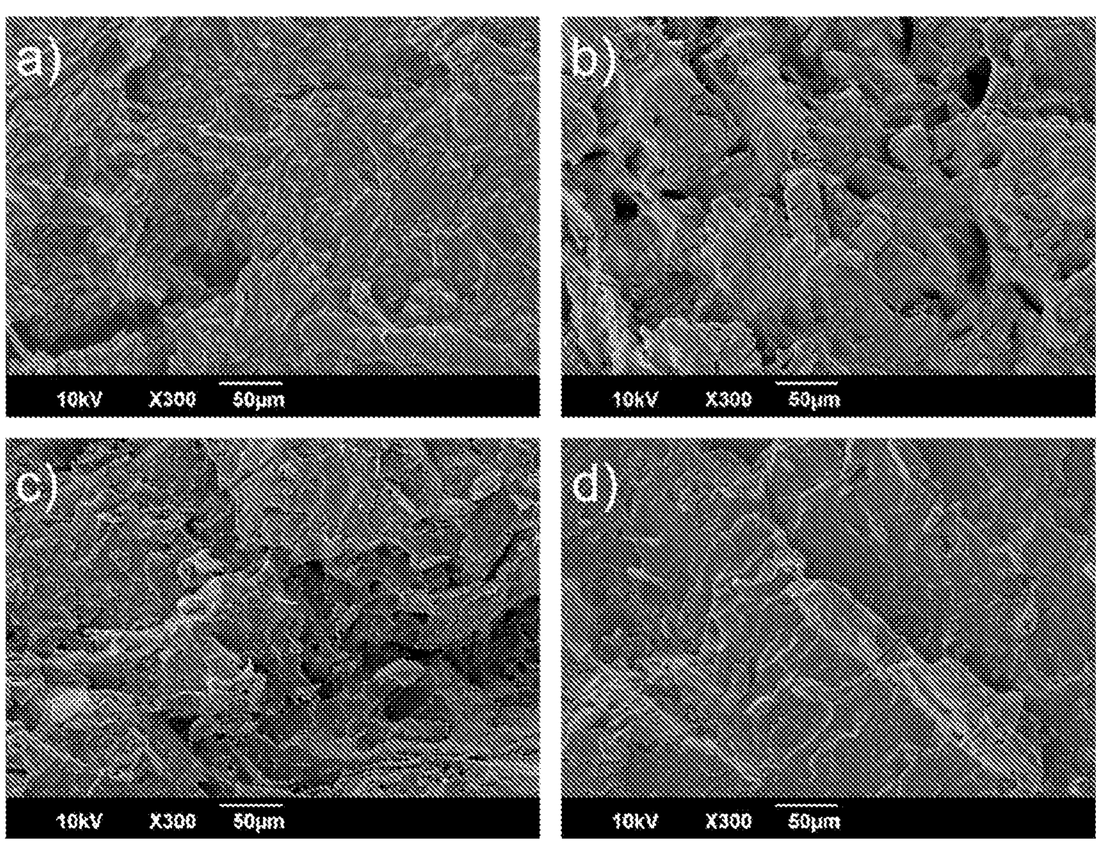
Figure 10:
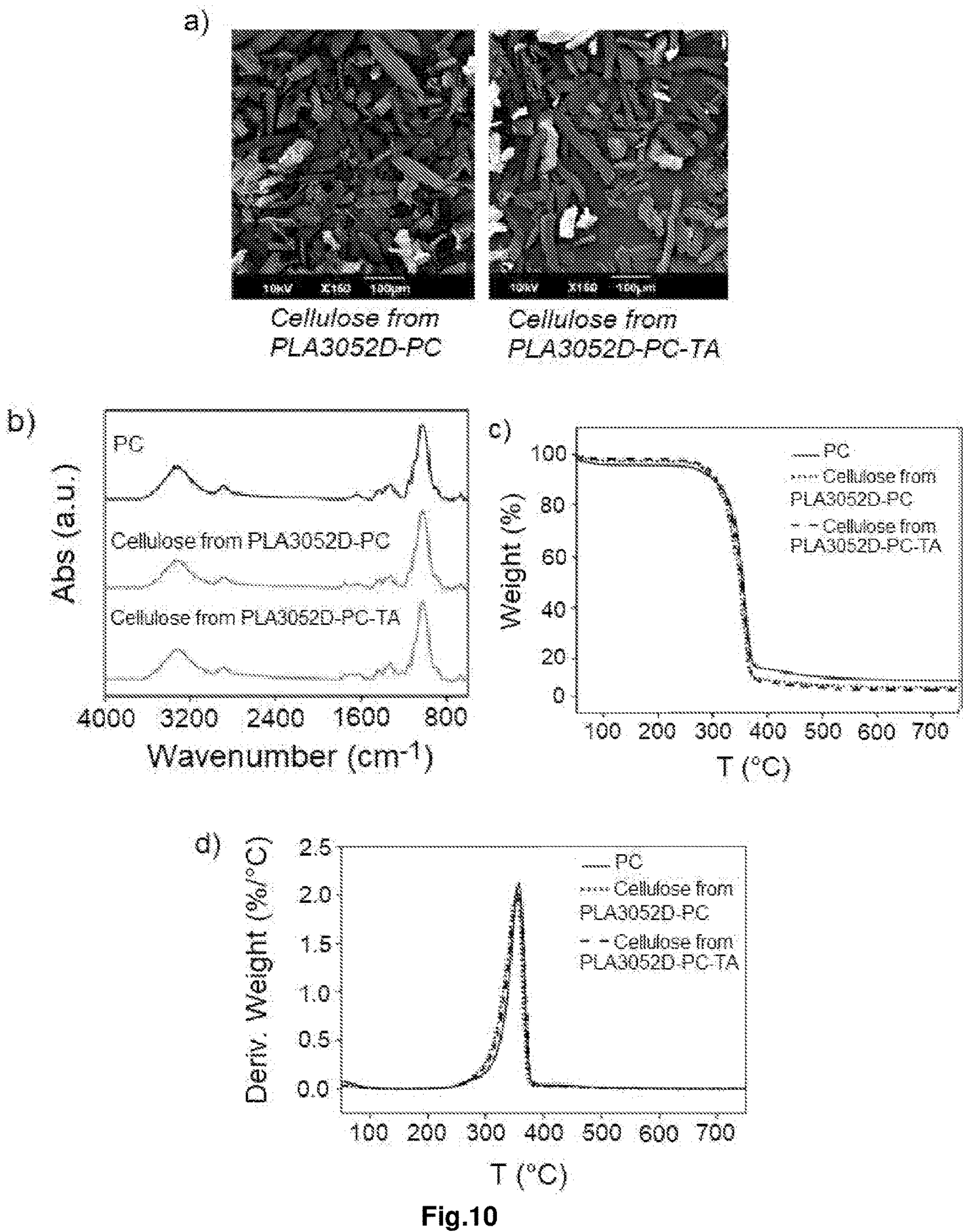
Figure 11:
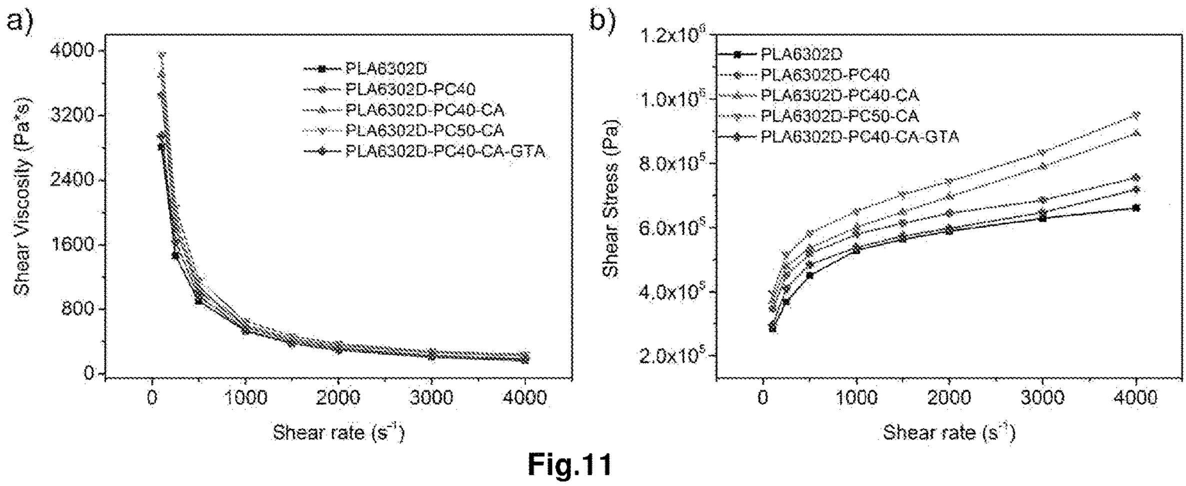
Figure 12:
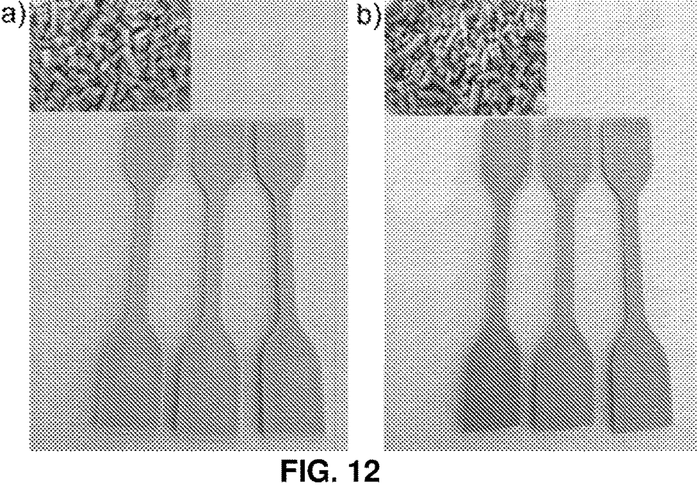
Figure 13:
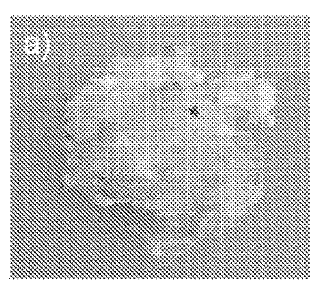
Figure 13:
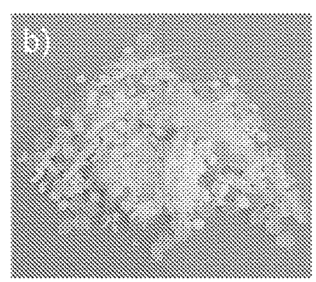
Figure 13:
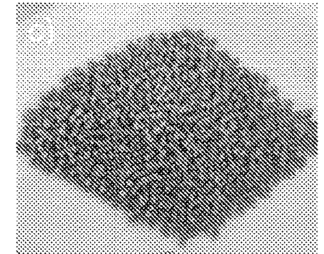
Figure 14:
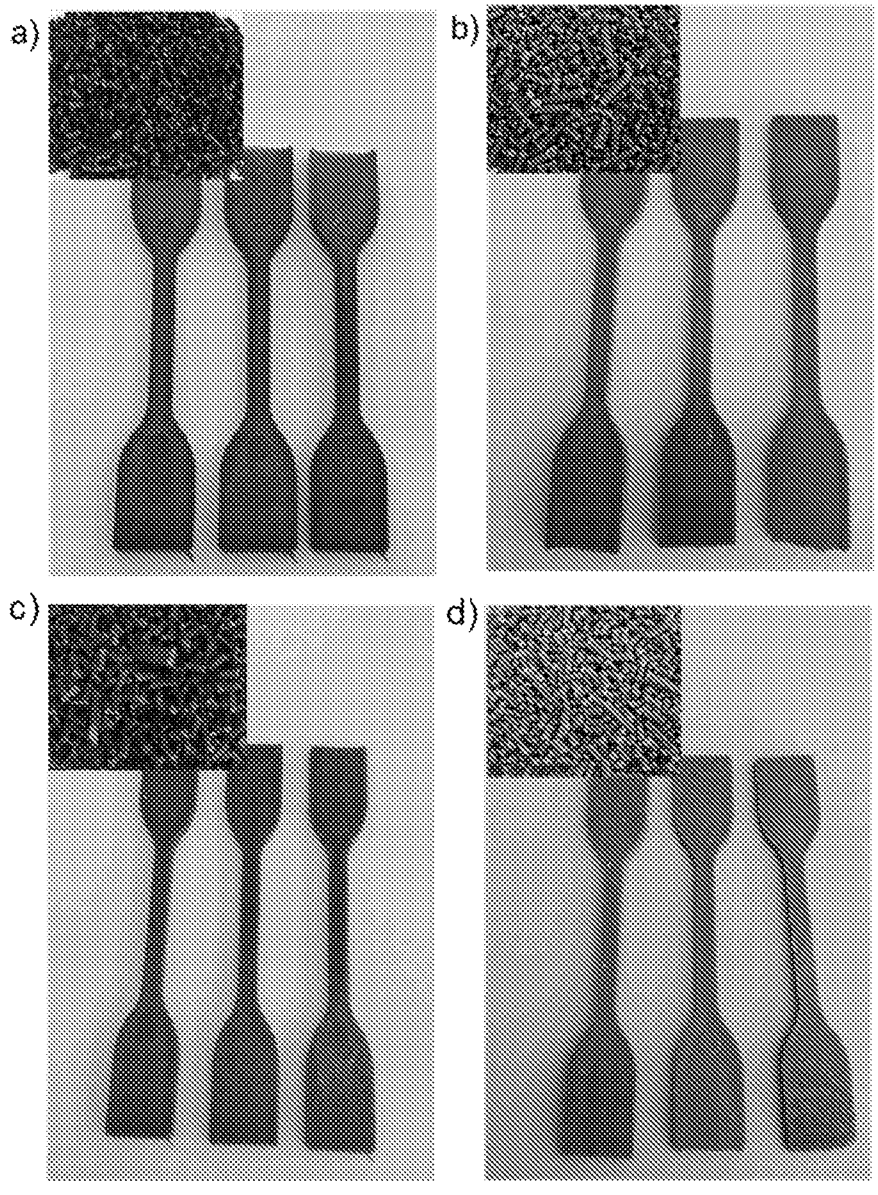
Figure 15:
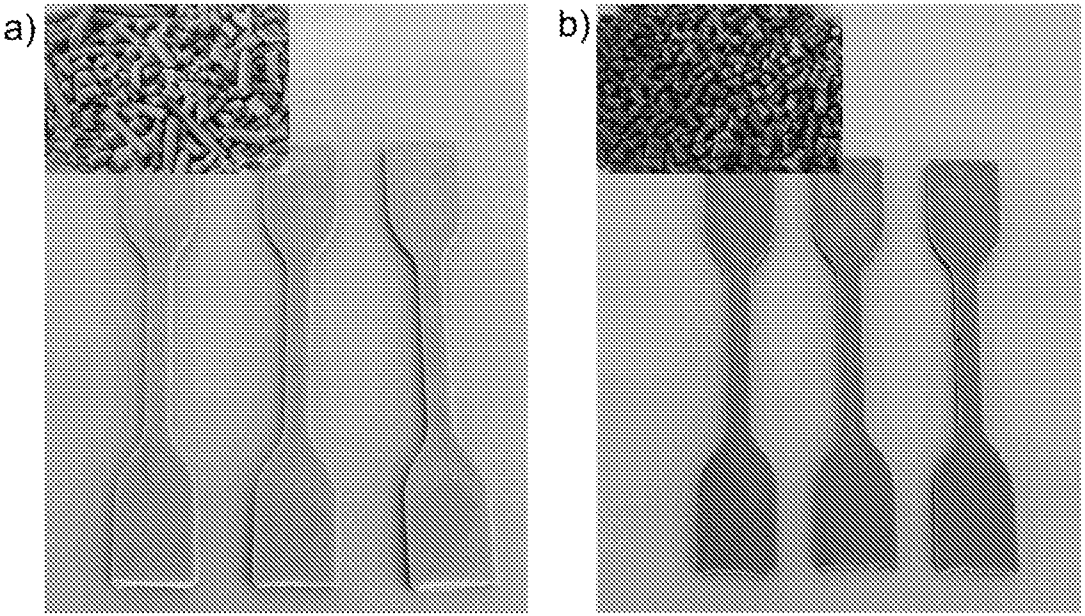

5*b*) of the thermogravimetric curves of the starting paper sheets and of the capsules obtained in Example 1;

FIG. 6 shows FTIR spectra of paper capsules (PC), of tannic acid (TA) and of paper capsules treated with tannic acid (PC/TA) such that the amount of TA in the final formulation is 5% wt with respect to the total weight of PLA and PC, as described in the following Example 2;

FIG. 7 shows the pictures of extruded pellets obtained by extrusion of the following formulations a) PLA6302D-PC, b) PLA6302D-PC-TEC-SOY, c) PLA6302D-PC50-CA-GTA, d) PLA6302D-PC60-CA-GTA, e) PLA-CB-CA-GTA and f) PLA2003D-SIL, as described in the following Example 3;

FIG. 8 shows pictures of dog-bone shaped items obtained from by injection moulding of pellets made of a) PLA6302D-CB-CA-GTA, b) PLA2003D-SIL and c) red-coloured PLA6302D-PC-CA-GTA; d) shows a picture of differently coloured spoons obtained by injection moulding of pellets made of PLA6302D-PC-CA-GTA, while e) and f) show pictures of a cup and a cup sealer obtained through injection moulding, as described in the following Example 4;

FIG. 9 shows SEM micrographs of pellets made from the formulations a) PLA6302D-PC and b) PLA6302D-PC-CA-GTA, identified in the following Table 1, and of fractured dog-bone shaped items made from c) PLA3052D-PC and d) PLA3052D-PC-TA, identified in the following Table 1;

FIG. 10 shows: a) SEM micrographs, b) FTIR spectra c) TGA curves and d) first derivative of the thermogravimetric curves of cellulose extracted, as described in the following Example 5, from dog-bone shaped items made with formulations PLA3052D-PC40 and PLA3052D-PC-TA, identified in the following Table 1;

FIG. 11 illustrates a) Shear viscosity and b) shear stress of PLA6302D-PC-based biocomposites, measured as described in the following Example 7;

FIG. 12 shows extruded pellets and injection moulded dog-bones made of a) PLA2003D-PC-20-GTA-CA-BW (Formulation 1) and b) PLA2003D-PC-30-GTA-CA-BW (Formulation 2) according to the invention, prepared as described in the following Example 11;

FIG. 13 shows, with reference to the following Example 11, the mixtures before extrusion for the comparison formulation 3 of PLA-PC-GTA-CA-BW-PVA (FIG. 13*a*) and for the comparison formulation 4 of PLA-PC-GTA-CA-BW-GF (FIG. 13*b*). FIG. 13*c* shows the extruded pellets from formulation 3;

FIG. 14 shows extruded pellets and injection moulded dog bones of the following comparison formulations described in the following Example 11: a) PLA2003D-PC-20-GTA-CA-BW-CL1 (Formulation 5) b) PLA2003D-PC-20-GTA-CA-CL1 (Formulation 6) c) PLA2003D-PC-20-GTA-CA-CL2 (Formulation 7) and d) PLA6302D-PC-20-GTA-CA-CL1 (Formulation 8);

FIG. 15 shows extruded pellets and injection moulded dog-bones of a formulation with 53.5% wt PLA2003D+ 40 wt % Paper capsules+ 0.5 wt % Citric acid+3% wt biobased wax+ 3% wt glycerol triacetate dried at 50° C. before extrusion (FIG. 15*a*) and extruded with 4.7% wt moisture with respect to the total material (10% wt with respect to cellulose) (FIG. 15*b*), according to the experiments described in the following Example 12.

DETAILED DESCRIPTION OF THE INVENTION

As said above, the present invention relates to a process for preparing biodegradable biocomposites, to these biodegradable biocomposites, to their use and to moulded articles, including articles having complex shapes, obtained by moulding processing the present biocomposites.

The term "biocomposite" indicates in this invention a composite material whose major weight portion, if not the whole of the formulations or items, consists of natural components, like cellulose, or components, such as poly (lactic acid) (PLA), which derive from enzymatic treatment of natural materials and subsequent polymerization.

The term "biodegradable" pertains to a material that degrades upon the action of naturally occurring microorganisms into non-harmful components such as carbon dioxide and water.

The present biodegradable biocomposite comprises a thermoplastic polymer material and a cellulosic material, and optionally one or more additives, wherein the thermoplastic polymer material is a melt extruded matrix with at least 10% by weight of cellulosic material in micronized form and homogeneously dispersed within the matrix.

With the present biodegradable biocomposite, preferably by injection moulding or compression moulding, moulded articles even of complex shape may be prepared that are also biodegradable.

As the thermoplastic polymer material in the present composites, commercially available polylactic acid (PLA) polymers such as the polylactides sold under the tradename Ingeo from Natureworks, are most preferably used. Modified polylactic acid and different stereo configurations may also be used, such as poly D-lactic acid, poly L-lactic acid, poly D-L-lactic acid, and combinations thereof. Polylactic acids with different degrees of crystallinity or amorphous may also be used. Other sustainable polyesters such as succinic acid based polyesters like polybutylenesuccinate (PBS), polyhydroxyalkanoates (PHAs), polycaprolactone (PCL), poly(DL-lactide-co-glycolide) (PGLA), poly(dioxanone) (PDO), poly(hydroxybutyrate-co-hydroxyvalerate) (PHBV), poly(1,4-butyleneadipate) (PBA), poly (butadiene adipate co-terephthalate) (PBAT), poly(ethylene carbonate) (PEC), poly(propylene carbonate) (PPC), thermoplastic starches, polyethylene oxides, and with non-biodegradable polymers such as polyurethanes, polyolefins and mixtures thereof, may also been used in the present invention in combination with PLA. The content of thermoplastic polymer material or mixtures thereof in the present invention may ranges from 35 to 90% by weight, more preferably from 35 to 55% by weight.

The cellulosic material content in the present invention is of at least 10% by weight with respect to the total weight of the composition, for instance from 10 to 60% by weight, more preferably between 30 and 60% by weight and even more preferably between 40 and 50% by weight.

According to the present invention by the term "cellulosic material" is meant any material based on cellulose, selected for instance from pure paper, cellulose pulp, waste paper, recycled paper, cardboard, coated and processed paper, vegetable leaves, fruit pulp and skin, such as coffee shells and platano banana, and pet food. According to the present invention, this cellulosic material is in the form of capsules that are compact capsules of millimetric size. In an aspect of this invention, by "millimetric size" it is meant that the present capsules have size greater than approximately 850 micrometers and up to few millimetres, for example approximately 8 millimeters. Preferably, the present capsules have size of about 3 mm of diameter and about 1 mm of height. In an aspect, as far as the size of the invention capsules are concerned, their diameter is greater than their thickness. The cellulosic capsules of this invention can be obtained by compression in punching machine of the above said different types of cellulosic materials in the form of sheets and foils, an example of which process is described in detail in the following. In this process, the paper sheet is interposed between the two plates of the punching machine that exerts a mechanical pressure on the paper sheet such that capsules are produced. To obtain capsules of the preferred size indicated above, a punching machine having a number of metal punching cylinders of about 3 mm of diameter is to be used. By varying the punching cylinder diameter and controlling the pressure exerted by them, different heights and diameters of the capsules can be obtained.

The present inventors have found a surprisingly better performance for the paper capsules of millimetric size of this invention with respect to the powder and micro-ground materials of the state of the art when subjected to extrusion by fusion, which positively affects both the final composites properties and the process conditions. First, the capsules' size of the invention are regular, all capsules have exactly the same size, thickness and shape; this makes the process highly reproducible and the final composite product perfectly homogeneous. Conversely, the powders, even when finely ground, do not guarantee the same homogeneity of the size, and this has effects on the final product. Moreover, without wanting to be bound to a theory, inventors deem that the paper capsules of millimetric size of this invention are able to absorb the possible liquid additives simply by impregnation, without negatively affecting the extrusion process. On the contrary, the addition of liquid additives to the powders and to the micro-ground materials would tend to form agglomerates that could deposit on the feeder's walls, thus creating problems to the extrusion process. In terms of mechanical properties, as shown also in the following examples, the performances of the composites obtainable by using powders are worse than performances of the present composites obtained by using capsules. This could be explained with a shortening of the length of the cellulose fibres due to pulverization with respect to the intact fibres of the capsules, which may result in a worsening of the mechanical properties.

Furthermore, the use of millimetric capsules has great advantages also on the process itself for the preparation of composites with respect to the use of powder and micro-ground materials, in terms of safety and efficiency of the process. In fact the capsules do not release fine dusts and particulates, and they can be mixed in the hopper with polymer pellets without the need of protection devices for the operators and without loos of materials. This is not feasible when powders are added, which require a dedicated feeder too, separated from the polymer pellets. In addition, the agglomerating nature of the powders and the heterogeneity of the particles composing them can cause plant stoppage problems, partially solved by adding vibrating components inside the feeders. Thanks to their higher density in bulk and to their homogeneity, the millimetric capsules of the invention do not show such problems. For the same reasons also the dispersion of the present millimetric capsules in the polymer pellets before extrusion by fusion is easier than that obtainable with a powder or a micro-ground material.

According to a particular embodiment of this invention, the biodegradable biocomposites consist of thermoplastic polymer material, cellulosic material in the form of capsules optionally treated with one or more additives.

The present biodegradable biocomposites are typically free from fillers, wherein by the term "fillers" are meant fiber glasses, minerals, such as mica, talc, clay, basalt, calcium carbonate and wollastonite, polymers with a higher melting point than that of the above said thermoplastic polymer material, such as polyvinyl alcohol and nylon, and ligno-cellulosic materials.

The additives of possible use in the present invention comprise non-toxic natural and/or food contact approved plasticizers, lubricants, rheology modifiers, stabilizers, colorants, processing aids, brighteners, antioxidants, and mixtures thereof. As described in detail in the following, these additives are preferably added to the cellulosic material as a pre-treatment before mixing it with the thermoplastic polymer material. They have proved to enhance the processability of the cellulosic materials, reduce their agglomeration, stabilize them against oxidation at the processing temperatures and compatibilize them with the hydrophobic polymer matrix such that the extruded strands present a light colour and a smooth surface, even at loadings of the cellulosic materials above 40% by weight. When used, the amount of these additive ingredients ranges from 0.1% to 15% by weight of the composition, more preferably from 0.5 to 5% by weight.

The process for the preparation of the biodegradable biocomposite described above according to this invention, comprises the following steps:

i) providing a cellulosic material in the form of capsules, optionally pre-treated with one or more additives, and a thermoplastic polymer material, and drying them so as to remove moisture;

ii) mixing dried cellulosic material in the form of capsules, with dried thermoplastic polymer material, to form a dried mixture wherein the cellulosic material is at least 10% by weight with respect to the total weight of the mixture;

iii) processing the mixture coming from step ii) by melt extrusion at a temperature ranging from 130 to 170° C., forming extruded strands of the present biodegradable biocomposite.

According to an embodiment of this process, it further comprises a step of pelletizing the extruded strands of biodegradable biocomposite. The strands coming from extrusion can be subjected to a cooling step before pelletizing, if necessary, for example by immersion in a water bath or in air. The so obtained pellets of the present biocomposites, preferably of about 4 mm in length, can then be used to feed a moulding equipment wherein, by injection moulding or by compression moulding, the present biodegradable biocomposites are processed in the form of shaped articles, also of complex form. Conventional thermoplastic processing methods, such as compression and injection moulding, can be used to yield films and objects of variable shape and dimensions, such as cups, boxes, dog-bones and cutlery starting from pellets of the present biodegradable biocomposites. The temperatures used for these moulding processes range between 140 and 170° C., and preferably between 145 and 165° C. It was observed by the inventors that the pre-treatment of cellulosic capsules with one or more additives does improve the processability of the biocomposites during moulding, and prevents the degradation of the cellulosic material, allowing obtainment of uniform materials, as observed both in their morphology and in physical appearance.

The drying procedure in step i) of the present process can be performed at a temperature ranging from 40 to 70° C. for a time period comprised between 8 and 48 hours, preferably at 50° C. for 12 hours, in order to remove the moisture in the thermoplastic polymer and in the cellulosic material before mixing them.

When additives are present in the biocomposites of the invention, they are added to the cellulosic materials capsules in a pre-treatment procedure of the capsules with said additives. These additives can be in liquid phase, in molten state, in suspension or dissolved in water; when water is used, it is preferably used in the range of 8-10% by weight with respect to the weight of the cellulosic material to be treated, which is an amount of water comparable to the natural moisture content in paper and can then be removed from the treated capsules in the subsequent drying step without requiring excessively long drying times and high temperatures. In an alternative preferred embodiment, an aqueous solution of the additives can be sprayed on the cellulosic capsules in order to further reduce the subsequent drying time. In another embodiment of the present process, viscous additives can also be mixed with the capsules without any dilution or dissolution process. In another embodiment of the present process, solid additives can be added to the paper capsules and melted by a gentle heating step when their thermal transition temperatures are below 70° C.; in this case, to allow impregnation of the cellulosic capsules with the molten additives, a heating step to 60-70° C. for about 3 hours is preferably performed.

It was observed by the inventors that the pre-treatment of cellulosic capsules by one or more additives provides for: a) more effective compatibilization of the melt blend components, b) improved processing characteristics in terms of melt viscosity, free flow of the melt and continuous strand formation during extrusion, c) paper stabilization against oxidation and thermal degradation at the processing temperatures, d) compatibilization of the cellulose within paper in the hydrophobic polymer matrix e) improved properties of the resulting material. The most significant results are reported in the following experimental part.

The additives of possible use in the present biocomposites can be selected from the group consisting of polyphenols, phenols, sugar alcohols, terpenes, oils, polyoils, esters, organic acids, waxes and mixtures thereof. A non-limitative exemplary selection of such additives comprises tannic acid, glycerol, carnauba wax, lignite wax, triethyl citrate, glycerol triacetate, corn oil, soy oil, castor oil, succinic acid, tartaric acid, citric acid, orange terpene, polyethylene glycol, sorbitol, corn starch, and mixtures thereof.

According to a preferred embodiment of the present process, one or more additives are added to the cellulosic capsules, and more preferably one or more additives bearing carboxylic, hydroxylic and ester moieties. Without wanting to be bound by a theory, these additives appear to be able to reduce cellulose agglomeration through hydrogen bonding interactions between the above said functional groups of the additive and the cellulose hydroxyl groups, thus providing an improved melt processability of the blends, stabilization of cellulose in the hydrophobic polymer matrix in the blends and against radical oxidation and thermal degradation.

In an embodiment of the invention process, one or more additives as described above, in particular colour modifiers such as stanch or colours for food, can also be added to the mixed materials before or after the melt extrusion step iii).

Once dried, the present thermoplastic polymer material and the cellulosic material possibly pre-treated by one or more additives, are then physically mixed in step ii) of the process; this mixture is then extruded.

The melt extrusion in step iii) of the present process is carried out at a temperature ranging from 130 to 170° C., and preferably from 135 to 165° C. This extrusion step may be performed in a dual-screw extruder with a screw speed ranging between 200 and 350 rpm, more preferably between 250 and 300 rpm, and a preferred feeding rate of the mixture of about 2 kg/h to obtain extruded strands of the present biocomposites.

In the present extrusion step, as a result of the high shear stresses to which the paper capsules are subjected during the pultrusion, they undergo a mechanical disintegration such that a homogenous dispersion is achieved in the melt even at high loadings and the produced strand is uniform and continuous. Microscopically, the cellulose in the blends is uniformly dispersed and coated by the polymer matrix without appreciable phase separation. After the extraction of the polymer matrix in chloroform, done only for the scope of characterization, the cellulose in the blends appears as an assembly of microparticles, confirming that a micronisation process occurs during the extrusion. Moreover, as observed for the moulding process, also the melt extrusion step iii) takes advantage of the pre-treatment of the cellulosic materials with one or more additives.

The present process can be easily scaled-up, rendered automated and continuous, from the manufacturing of the cellulosic capsules that are then fed in a gravimetric feeder with additives and thermoplastic polymer, until extrusion in a continuous way to obtain the biocomposites strands that are then pelletized.

The present biodegradable biocomposites are environmentally friendly and commercially attractive, as for example compared to pure PLA, they exhibit faster biodegradability, higher heat resistance, comparable or higher Young's modulus and improved oxygen barrier properties. They can be used therefore for various applications that include, but are not restricted to, food and cosmetic packaging, manufacturing of several types of disposable items, pipelines and tubes for agriculture, laminated papers, food trays, cutlery, brushes, combs, and toys.

The process of this invention, besides being simple and cost-effective per se, is economic-ally and environmentally sustainable as it allows employing the conventional melt processing techniques used for thermoplastics and without solvents except for a possible low amount of water. Additives possibly used in the present process do not exceed 15% by weight of the total composition, more preferably their content is far lower and they comprise commercially available, low cost, FDA approved and commonly employed natural additives.

Moreover, the present biocomposites are obtained by blending paper, wastepaper, cardboard and other cellulosic materials with PLA and other biodegradable thermoplastic polyesters, and has comparable or superior mechanical, rheological and oxygen barrier properties and an improved biodegradability and heat resistance than the pure polymers and petroleum-based plastics. They represent therefore a cost-effective and greener alternative to the plastics in several applications, including, but not limited to, disposable items like cutlery, glasses and cups, food and cosmetic packaging materials, toys, furniture, pipes and tubes for agriculture, automotive, and household items in general.

Finally, the market of biodegradable plastics and composites is almost exclusively dominated by polyesters such as PLA and their price is still higher than conventional plastics. The incorporation of high loadings of paper in PLA, as in the present process, allows reducing the cost of final products. Moreover, when the paper used comprise paper and cardboard from industrial and domestic wastes, or agricultural or food cellulose-rich wastes, in such case the blending with PLA is not only commercially attractive but it also allows recycling waste products and strongly reducing the cost for disposal of those wastes, in agreement with the modern principles of circular economy.

The present invention will be now described in detail by the following non-limiting examples.

Example 1

Preparation and Characterization of Paper Capsules

Figure 1:
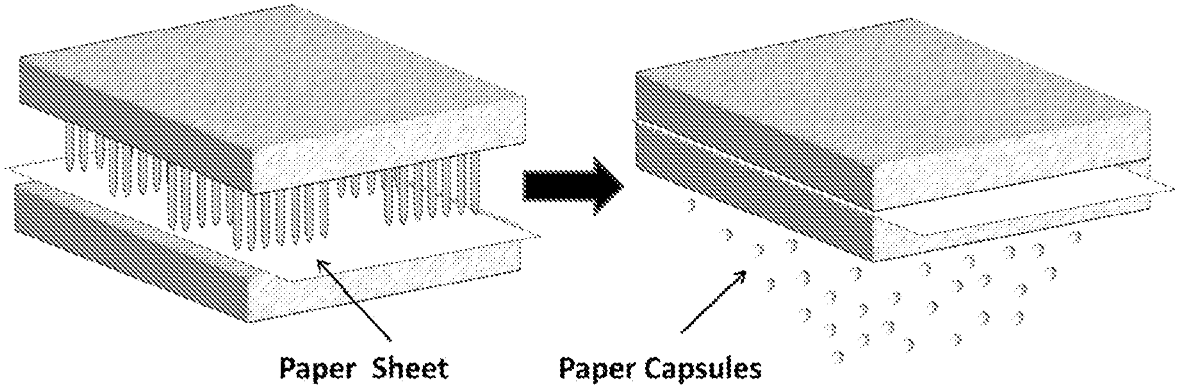
FIG. 1 shows schematically a punching machine for producing paper capsules from paper sheets, according to the following Example 1.
Figure 2:
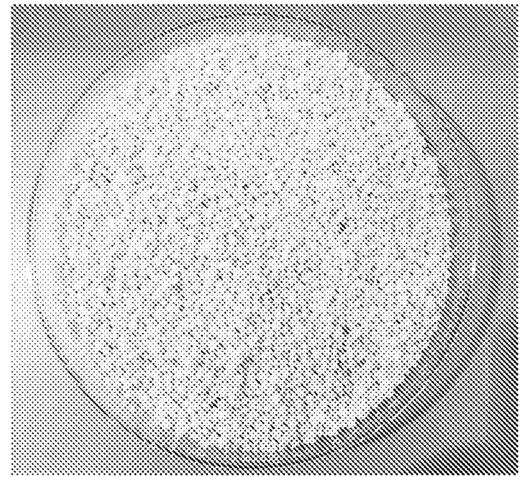
FIG. 2 is a picture of the paper capsules obtained in Example 1, collected in a tray.

Paper sheets obtained from the compression of softwood pulp were cut in rectangular strips of 5 cm×10 cm, and inserted between the metal plates of a punching machine, schematically shown in FIG. 1. The bottom plate of this machine is perforated with a lattice of holes with a diameter of 5 mm, whereas the upper plate is equipped with cylindrical metal punchers of 3 mm of diameter that apply mechanical pressure on the sheet, such that upon their downward movement, paper capsules with a diameter of 3 mm and a height of 1 mm are produced. The paper capsules so obtained were then collected in a tray, illustrated in FIG. 2.

Figure 3:
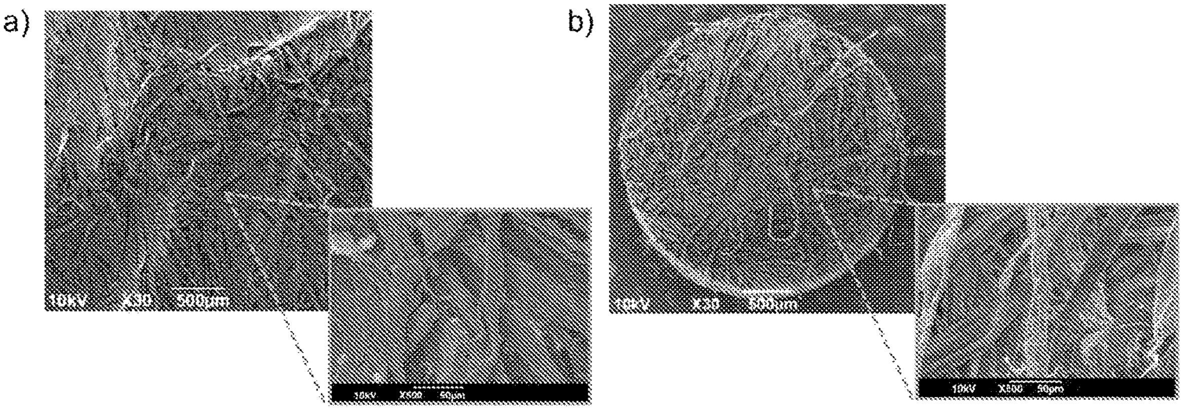
FIG. 3 shows SEM (Scanning Electron Microscopy) micrographs of paper before (FIG. 3*a*) and (FIG. 3*b*) after capsulization as in the following Example 1.

The morphology of paper sheets and capsules was characterized by scanning electron microscopy (SEM) using a JEOL JSM-6490LA microscope operated in high vacuum with an acceleration voltage of 10 kV. Prior to imaging, each sample was coated with a 10 nm-thick gold layer, using a Cressington 208HR high-resolution sputter coater (Cressington Scientific Instrument Ltd., UK). As shown in FIG. 3, the paper capsules have a fibrous morphology (FIG. 3*b*) similar to that of the starting paper sheets (FIG. 3*a*).

Figure 4:
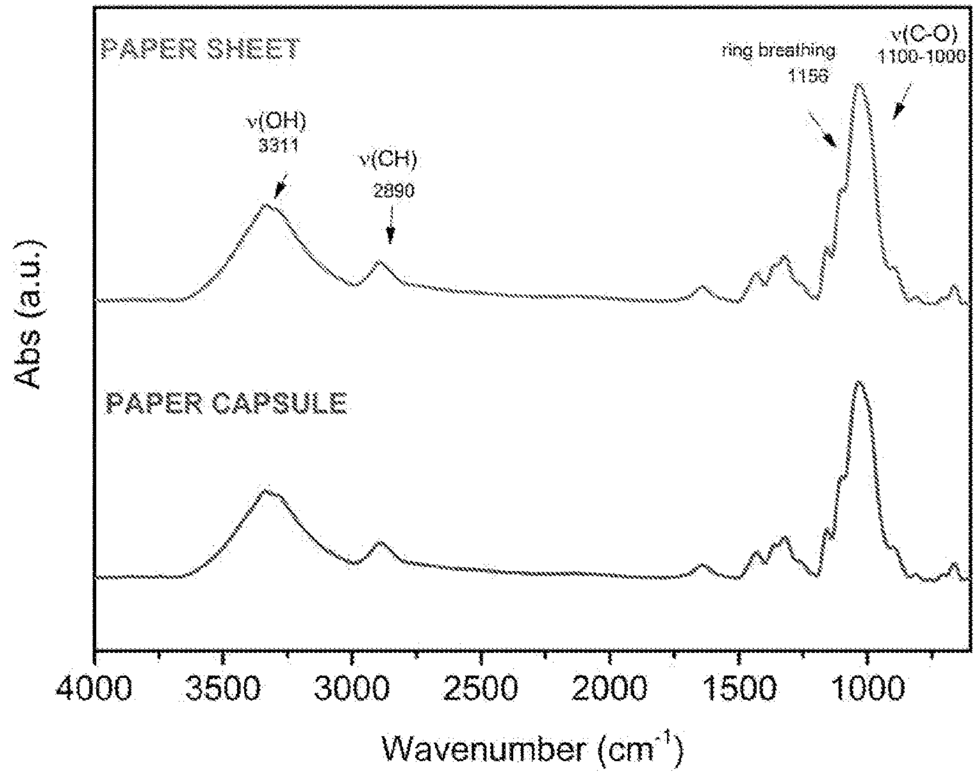
FIG. 4 shows the FTIR (Fourier Transform Infrared Spectroscopy) spectra of starting paper sheets and of the paper capsules obtained in Example 1.

In order to study their chemical structure, FTIR (Fourier Transform Infrared Spectroscopy) spectra were acquired for both the starting paper sheets and the prepared paper capsules, accumulating 128 scans in the 4000-600 $cm^{-1}$ spectral range with a scanning resolution of 4 $cm^{-1}$ using a spectrometer (Equinox 70 FT-IR, Bruker) coupled to an attenuated total reflectance (ATR) accessory (MIRacle ATR, PIKE Technologies). FTIR spectra, showing substantially the same absorption peaks thus indicating a similar chemical structure, are shown in FIG. 4.

Thermal degradation profiles shown in FIG. 5 were then obtained through thermogravimetric analysis (TGA) (Q500, TA Instruments). Measurements were performed on 3-5 mg of samples placed in an aluminium pan under inert N2 atmosphere with a flow rate of 50 ml·$min^{-1}$ at a temperature ranging from room temperature to 600° C. and at a heating rate of 10° C.·$min^{-1}$. The weight loss (FIG. 5*a*) and its first derivative (FIG. 5*b*) were recorded simultaneously as a function of time/temperature. Also in this case, a very similar thermal degradation profile was obtained, with a $T_{deg}$ of 355° C. for both materials.

From the experiments described above it was clear that the capsules obtained have similar fibrous morphology, chemical structure and thermal degradation profile of the starting paper sheets, thus indicating that the capsulization, i.e. the formation of capsules, does not alter the paper's chemical and physical properties.

The same process of capsulization described above was carried out also starting from Platano, Coffee, pet food and silicone coated paper capsules.

Example 2

Formulation of the Capsules

Starting from the capsules obtained as described in the Example 1 above, the formulations illustrated in the following Table 1 have been prepared by using PLA or a mixture of PLA with PBS as the thermoplastic polymer matrix.

TABLE 1

| | Biocomposite | Thermoplastic Polymer (wt %) | Filler (wt %) | Additive (wt %) | Additive (wt %) | Additive (wt %) |
|---|---|---|---|---|---|---|
| 1 | PLA3052D-PC | PLA3052D (60%) | Paper Capsules (PC) (40%) | | | |
| 2 | PLA6302D-PC | PLA6302D (60%) | Paper Capsules (40%) | | | |
| 3 | PLA3052D-PC-TA | PLA3052D (55%) | Paper Capsules (40)% | Tannic Acid (TA) (5%) | | |
| 4 | PLA6302D-PC-CA | PLA6302D (49.5%) | Paper Capsules (50%) | Citric Acid (CA) (0.5%) | | |
| 5 | PLA6302-D-PC-CA-GTA | PLA6302D (36-57%) | Paper Capsules (40-60%) | Citric Acid (0.3-0.5%) | Glycerol Triacetate (GTA) (2.5-3.7%) | |
| 6 | PLA3052D-PC-TEC-SOY | PLA3052D (50%) | Paper Capsules (40%) | Triethyl Citrate (5%) | Soy Oil (5%) | |
| 7 | PLA3052D-BN-ST-GLY | PLA3052D (55%) | Platano Banana Pulp Capsules (20%) | Corn Starch (ST) (20%) | Glycerol (GLY) (5%) | |
| 8 | PLA2003D-SIL | PLA2003D (60%) | Silicone Coated Paper capsules (40%) | | | |
| 9 | PLA6302D-SIL | PLA6302D (60%) | Silicone Coated Paper capsules (40%) | | | |
| 10 | PLA6302D-COFFEE | PlA6302D (60%) | Coffee Capsules (40%) | | | |
| 11 | PLA3052D-PC-SA | PLA3052D (49.5%) | Paper Capsules (50%) | Succinic Acid (0.5%) | | |
| 12 | PLA6302D-PET FOOD | PLA6302D (60%) | Pet Food Capsules(40%) | | | |
| 13 | PLA3052D-PBS-PC | PLA3052D (50%) PBS (10%) | Paper Capsules (40%) | | | |

TABLE 1-continued

| | Biocomposite | Thermoplastic Polymer (wt %) | Filler (wt %) | Additive (wt %) | Additive (wt %) | Additive (wt %) |
|---|---|---|---|---|---|---|
| 14 | PLA6302D-CB-CA-GTA | PLA6302D (67%) | Cardboard Capsules (CB) (30%) | Citric Acid (0.5%) | Glycerol Triacetate (2.5%) | |
| 15 | PLA2003D-PC-CA-CO-CW | PLA2003D (44.5%) | Paper Capsules (50%) | Citric Acid (0.5%) | Carnauba Wax (CW) (2.5%) | Castor Oil (CO) (2.5%) |
| 16 | PLA2003D-PC-CA-MW | PLA2003D (56.5%) | Paper Capsules (40%) | Citric Acid (0.5%) | Lignite Wax (MW)(3%) | |

For each formulation in Table 1 at least 500 g were produced as follows. Polymers and capsules were first dried for 12 hours at 50° C. to remove moisture. In formulations 1, 2, 8, 9, 10, 12 and 13 after drying, the ingredients were mixed manually and fed in the extruder. In formulations 3-5, 11 and 14-16 the powder has been first dissolved in water and the so obtained solution was dispensed on the paper capsules in such a ratio to obtain 0.08-0.16 g of solution per each gram of paper to allow impregnation of the paper by the solution. After drying at 50° C. for 12 h, the treated paper capsules were first manually mixed with liquid additives and then with PLA and solid additives in pellets and subsequently the so-obtained blend was fed in the extruder. In formulations 6 and 7, the additives have been added onto the dried paper capsules and then such capsules were mixed manually with PLA and fed in the extruder.

FTIR spectra have been recorded for paper capsules (PC), tannic acid (TA) and for the formulation No. 3 in Table 1, i.e. for paper capsules treated with tannic acid (PC/TA) such that the amount of TA in the final formulation is 5% wt with respect to the total weight of PLA and PC. As shown in FIG. 6, the shifts of the C—O stretching band of TA from 1189 to 1180 $cm^{-1}$ and of both the O—H stretching bands of cellulose (3322 $cm^{-1}$) and TA (3304 $cm^{-1}$) to a broader band centered at 3325 $cm^{-1}$ indicate that hydrogen bonding interactions exist between the two materials, cellulose and TA. An improved melt processability of the blends, stabilization of cellulose in the hydrophobic polymer matrix and against radical oxidation and thermal degradation, are thus expected.

Example 3

Extrusion of the Formulated Capsules

The extrusion of the blended formulations in Table 1 of Example 2 above was performed through a six zones double-screw extruder (Eurexma, Eurotech extrusion machinery Srl) with a ratio length to diameter (L/D) of the screws of 14:1. The extruder was equipped with a hopper for the gravimetric feeding of the materials.

For the formulations 1, 3, 6, 7, 8, 11, 13, 15, 16 in Table 1 the following conditions were used:

Feeding rate: 2 kg/h

Screw Speed: 250-300 rpm $T_1$=150-160° C., $T_2$=155-160° C., $T_3$=160-165° C., $T_4$=160-165° C., $T_5$=165-170° C., $T_6$=165-170° C., Die: 160-165° C.

For the extrusion of formulations 2, 4, 5, 9, 10, 12, 14 of Table 1 the following conditions were used:

Feeding rate: 2 kg/h

Screw speed: 250-300 rpm $T_1$=130-135° C., $T_2$=130-135° C., $T_3$=130-135° C., $T_4$=135-140° C., $T_5$=140-145° C., $T_6$=140-145° C., Die: 130-135° C.

The extruded strands were then cooled in a water bath and introduced in a pelletizer to obtain pellets with a length of 4 mm. Such pellets present a smoother surface and a lighter colour compared to those with unfunctionalized paper due to the treatment of paper with antioxidants, oils, waxes, GTA TEC and the like, used alone or in combination, or in silicone coated wastepaper due to the layer of silicone that acts as stabilizer. Pictures of the extruded pellets are shown in FIG. 7.

Example 4

Injection Moulding and Compression Moulding

The extruded pellets as obtained in Example 3 have been dried at 50° C. for 12 h and then processed into an injection moulding machine (Megatech H7/18, TecnicaDuebi Sri), equipped with a stainless-steel mould for the production of prismatic dog-bone shaped items (76×4×2 mm).

For formulations 1, 3, 6, 7, 8, 11, 13, 15, 16 of Table 1 above and, more generally, for any blends of PLA3052D and PLA2003D, the following conditions were used:

T: 160°-170° C.

Injection Pressure: 140 bar

Dose: 14 mm

For formulations 2, 4, 5, 9, 10, 12, 14 of Table 1 above and, more generally, any blends of PLA6302D, the following conditions were used:

T: 145-155° C.

Injection Pressure: 140 bar

Dose: 18 mm

The so obtained items presented a homogeneous colour and a smooth surface. As described above in Example 3, the materials in which paper was compatibilized before the extrusion exhibited a much lighter coloration (see FIG. 8*a, b, c*).

Food colorants were added to the biocomposite extruded from formulation 5 prior to the injection moulding process, by physically mixing the colorant powder with the pellets such that coloured dog-bone shaped items and other objects were obtained (see FIG. 8*d*). The amount of food colorant was 1% wt with respect to the total weight of the pellets. The objects include spoons, rings and cups that could be used as disposable cutlery, packaging materials for food and cosmetics, thermosealable reinforcements for glasses and the like (see FIG. 8*e, f*).

Alternatively, the extruded pellets were also processed through compression moulding using a hot press machine (Carver 4386, Carver, Inc.). Films with a thickness ranging from 400 and 500 µm were obtained upon heating 7.5 g of extruded pellets as per Example 3 above at 145° C. for PLA6302D-based composites, and at 165-170° C. for PLA3052D- and PLA2003D-based composites for 5 min followed by application of a pressure of 10 tons for 5 min and finally cooling at room temperature.

Example 5

Morphology of the Biocomposites

The morphology of the extruded pellets obtained from formulations 2 and 5 of Table 1 above and of the fracture surface of the dog-bone shaped samples obtained from formulations 1 and 3 of Table 1, was characterized by scanning electron microscopy (SEM), which was performed as described above in Example 1.

The cellulose fibres of paper in the biocomposites result well dispersed and entirely coated by the PLA polymer matrix, as shown in FIG. 9, in both pellets and dog-bone shaped items. The pellets in which paper was treated with CA and GTA or TA (formulations 3,5) exhibited a more compact and less rough morphology (see FIG. 9*b,d*) compared to the samples with untreated paper (formulations 1,2) (see FIG. 9*a,c*)

Moreover, the paper within the biocomposite pellets and dog-bones obtained from formulations 1 and 3 of Table 1 above was extracted by precipitation in chloroform and purified upon filtration under vacuum. The resulting powders were subjected to chemical, morphological and thermal degradation analysis. The SEM micrographs in FIG. 10*a* show that, in both materials, the cellulose fibres undergo a micronization upon melt compounding during extrusion and injection moulding. Additionally, since negligible differences were observed in the FTIR spectrum and in the thermal degradation profile of said cellulose powders compared to the original paper capsules (see FIG. 10*b,c,d*) it can be concluded that cellulose does not undergo any substantial thermal or chemical degradation during processing to obtain the present biocomposites.

Example 6

Mechanical Properties

The mechanical properties of the some representative biocomposites have been studied and the results are reported in the following Table 2. Such properties were determined by uniaxial tensile tests through a dual column universal testing machine (Instron 3365) equipped with a 500N load cell. Measurements were performed at controlled environmental conditions (T=21° C., relative humidity 45%) on prismatic dog-bone shaped specimens (gauge length 35 mm, width 4 mm) obtained through injection moulding as described in Example 4 above. The specimens were strained with a rate of 5 mm $min^{-1}$ until fracture occurred. The values of the Young's modulus, of the ultimate tensile strength (UTS) and of the elongation at break were calculated as the average of 10 different samples. All the values have been normalized by the respective sample thickness.

TABLE 2

| # | Material | Composition (wt %) | Young's Modulus (MPa) | Ultimate tensile strength (MPa) | Elongation at Break (%) |
|---|---|---|---|---|---|
| 1 | PLA3052D-PC | PLA (60%)<br>PC (40%) | 1870 ± 100 | 55 ± 2 | 4 ± 2 |
| 2 | PLA6302D-PC | PLA (60%)<br>PC (40%) | 1948 ± 21 | 61 ± 1 | 6 ± 0.5 |
| 3 | PLA2003D-PC | PLA (60%)<br>PC (40%) | 2281 ± 109 | 68 ± 0.2 | 4.5 ± 1 |
| 4 | PLA3052D-PC-TA | PLA (55%)<br>PC (40%)<br>TA (5%) | 1740 ± 100 | 57 ± 0.5 | 6 ± 2 |
| 5 | PLA6302D-PC-CA | PLA (49.5%)<br>PC (50%)<br>CA (0.5%) | 2100 ± 50 | 58 ± 2 | 4.5 ± 0.3 |
| 6 | PLA6302D-PC40-CA-GTA | PLA (57%)<br>PC (40%)<br>CA (0.5%)<br>GTA (2.5%) | 1971 ± 150 | 57 ± 2 | 5 ± 0.3 |
| 7 | PLA6302D-PC50-CA-GTA | PLA (46%)<br>PC (50%)<br>CA (0.4%)<br>GTA (3.6%) | 1850 ± 84 | 60 ± 1 | 5 ± 1 |
| 8 | PLA6302D-PC60-CA-GTA | PLA (36%)<br>PC (60%)<br>CA (0.3%)<br>GTA (3.7%) | 1700 ± 150 | 50 ± 4 | 5 ± 1.5 |
| 9 | PLA6302D-PC-TEC | PLA (50%)<br>PC (40%)<br>TEC (10%) | 1835 ± 110 | 51 ± 1 | 7.1 ± 1 |
| 10 | PLA3052D-BN-ST-GLY | PLA (55%)<br>BN (20%)<br>ST (20%)<br>GLY (5%) | 1365 ± 84 | 36 ± 2 | 3 ± 1.5 |
| 11 | PLA2003D-SIL | PLA (60%)<br>SIL (40%) | 2139 ± 104 | 64 ± 5 | 5 ± 1 |
| 12 | PLA6302D-COFFEE | PLA (60%)<br>COFFEE (40%) | 1650 ± 50 | 40 ± 1 | 4 ± 1 |
| 13 | PLA3052D-PC-SA | PLA (49%)<br>PC (50%)<br>SA (1%) | 1950 ± 200 | 65 ± 1 | 6 ± 0.7 |

TABLE 2-continued

| # | Material | Composition (wt %) | Young's Modulus (MPa) | Ultimate tensile strength (MPa) | Elongation at Break (%) |
|---|---|---|---|---|---|
| 14 | PLA6302D-PET FOOD | PLA (60%)<br>PET FOOD (40%) | 1956 ± 33 | 34 ± 1 | 4 ± 1 |
| 15 | PLA3052D-PBS-PC | PLA (50%)<br>PBS (10%)<br>PC (40%) | 1800 ± 100 | 57 ± 1 | 5 ± 1 |
| 16 | PLA6302D-CB-CA-GTA | PLA (67%)<br>CB (30%)<br>CA (0.5%)<br>GTA (2.5%) | 1750 ± 100 | 56 ± 1 | 6 ± 0.5 |
| 17 | PLA2003D-PC40-CA-GTA | PLA (57%)<br>PC (40%)<br>CA (0.5%)<br>GTA (2.5%) | 2205 ± 109 | 63 ± 0.5 | 5 ± 1 |
| 18 (comparison) | PLA3052D | PLA (100%) | 1350 ± 28 | 60 ± 0.7 | 8 ± 0.7 |
| 19 (comparison) | PLA6302D | PLA (100%) | 1600 ± 74 | 58 ± 0.6 | 12 ± 1 |
| 20 (comparison) | PLA2003D | PLA (100%) | 1620 ± 126 | 61 ± 1.7 | 8 ± 0.7 |

All the tested exhibited a remarkable enhancement in the Young's modulus with respect to pure PLA, with variations up to 45%, 31% and 41% observed in the PLA3052D, PLA6302D and PLA2003D-based formulations respectively.

The UTS is comparable to the values of pure PLA for most of the materials. The composites PLA3052D-CP-SA and PLA2003D-PC presented sensibly higher UTS. In other cases, when cellulosic capsules such as coffee, banana pulp and pet food were used rather than paper capsules, the UTS decreased to 51-34 MPa. However, the said UTS values are still higher or similar with respect to other non-biodegradable polymers used for packaging such as polyethylene (15 MPa), polypropylene (40 MPa) and polystyrene (40 MPa). In all the tested materials of the invention, the elongation at break was found lower than pure PLA, as generally expected from cellulose composites. However, when cellulose was compatibilized with TA, SA or presented a silicone coating such decrease is only of 25% compared to the 50% variation found for the biocomposites in which cellulose was not functionalized.

Example 7

Rheological Properties

The rheological curves of the extruded pellets in Table 3 below were obtained at 145° C. through a capillary rheometer (CEAST SR20, Instron). Prior to the tests the pellets obtained as described above in Example 3 were dried at 50° C. for 12 h. For the shear viscosity measurements, typically 50 g of pellets were introduced in the barrel of the rheometer (working length=290 mm) and a piston was allowed to push the material through a capillary die (length=20 mm, diameter=1 mm) at different shear rates ranging from 0 to 4000 $s^{-1}$.

TABLE 3

| # | Material | Composition (wt %) |
|---|---|---|
| 1 (comparison) | PLA6302D | PLA (100%) |
| 2 | PLA6302D-PC40 | PLA (60%<br>PC (40%) |
| 3 | PLA6302D-PC40-CA | PLA(59.5%)<br>PC (40%)<br>CA (0.5%) |
| 4 | PLA6302D-PC50-CA | PLA(49.5%)<br>PC (50%)<br>CA (0.5%) |
| 5 | PLA6302D-PC-40-CA-GTA | PLA(57%)<br>PC(40%)<br>CA(0.5%)<br>GTA(2.5%) |

The tested biocomposites presented a higher shear viscosity at low shear rates in the region between 100 and 1000 $s^{-1}$ and a sensibly higher shear stress in the entire range of shear rates (100-4000 $s^{-1}$) with respect to pure PLA. It was observed that these values increased with the amount of paper in the material, for example from 40% wt to 50% wt. The addition of plasticizers, such as GTA, decreases the shear viscosity and the shear stress to values similar to those of PLA.

The melt flow rate (MFR) of the samples in Table 4 below was determined at 210° C. according to ASTM D1238 B. 6-8 g of pellets extruded as described in Example 3 were typically introduced in the barrel of the melt flow index machine (Instron MF-20) and a weight of 2.16 kg was then applied over a piston that pushed the material downward for a measure length of 25.4 mm. The strand collected from a die of 2.095 mm in diameter was weighted to determine the density of the melt (d) and the relative melt flow rate (MFR) from the measured melt volume rate (MVR) according to the following Equation 1:

$$MFR = MVR \cdot d \tag{1}$$

TABLE 4

| # | Material | Composition (wt %) | MVR ($cm^3$/10 min) | MFR (g/10 min) | Melt Density ($g/cm^3$) |
|---|---|---|---|---|---|
| 1 (comparison) | PLA3052D | PLA (100%) | 30.22 ± 1.14 | 31.60 ± 1.20 | 1.0458 |
| 2 (comparison) | PLA6302D | PLA (100%) | 44.15 ± 15 | 46.54 ± 0.50 | 1.0541 |
| 3 | PLA6302D-PC | PLA (70%) PC (30%) | 13.30 ± 0.66 | 15.17 ± 0.75 | 1.1404 |
| 4 | PLA6302D-PC | PLA (60%) PC (40%) | 8.95 ± 1.90 | 10.06 ± 1.75 | 1.1237 |
| 5 | PLA3052D-PC-TA | PLA (55%) PC (40%) TA (5%) | 60.86 ± 2.51 | 79.75 ± 3.23 | 1.3102 |
| 6 | PLA6302D-PC-CA | PLA (49.5%) PC (50%) CA (0.5%) | 10.35 ± 1.84 | 12.74 ± 2.26 | 1.2305 |
| 7 | PLA3052D-PC-SA | PLA (49%) PC (50%) SA (1%) | 36.72 ± 1.83 | 44.86 ± 2.23 | 1.2232 |
| 8 | PLA6302D-PC-CA-TEC | PLA (57%) PC (40%) CA (0.5%) TEC (2.5%) | 20.44 ± 1.88 | 20.87 ± 1.91 | 1.0211 |
| 9 | PLA6302D-PC-CA-GTA | PLA (57%) PC (40%) CA (0.5%) GTA (2.5%) | 13.19 ± 1.65 | 15.69 ± 1.96 | 1.1930 |

The tested biocomposites exhibited MFR values between 10 and 20 g/10 min, much lower with respect to the extruded PLA. The MFR was found to decrease upon increasing the amount of paper, for example from 30 to 40% wt. MFR values in this range are multipurpose and are indicated especially for extrusion and injection moulding. The addition of SA and TA has determined an exceptional increase in the MFR compared to formulations with only PLA and PC. The obtained values, 44.86±2.23 g/10 min and 79.75±3.23 g/min, render these materials suitable for melt processes, in which a high flow is required such as fiber melt spinning.

Example 8

Oxygen Barrier Properties

The oxygen permeation tests were performed on films obtained as described above in Example 4 and reported in Table 5 using an Oxysense® 5250i device (Oxysense®, USA) equipped with a film permeation chamber, according to ASTM Method F3136-15 (ASTM 1989). The tests were performed under standard laboratory conditions, i.e. temperature of 23° C. and 50% of relative humidity. The permeation chamber consisted of a cylinder divided into two parts (sensing well and driving well). The sensing well was instrumented with a fluorescence sensor called Oxydot®, sensitive to the oxygen concentration. This chamber was purged with nitrogen while the other one (driving well) was kept open to ambient air. The films obtained as per example 5 were cut into a rectangular piece (6 cm×6 cm) and placed inside the chamber. The OxySense® fiber optic pen measures the oxygen reading from the Oxydot®, at specific time intervals. The oxygen transmission rate (OTR) of each film was measured by monitoring the oxygen uptake with time. Oxysense® OTR software used this oxygen evolution to determine the OTR of films. At least five readings were taken for each sample with a minimum coefficient of determination ($R^2$) value of 0.95. The oxygen permeability of the films was then calculated according to the following Equation 2

$$OP = OTR \cdot Ft \qquad (2)$$

where OP is the oxygen permeability, OTR is the oxygen transmission rate, and Ft is the film thickness.

TABLE 5

| # | Material | Composition (wt %) | OTR (ml/$m^2$/day) | OP (ml · mm/$m^2$/day) |
|---|---|---|---|---|
| 1 (comparison) | PLA2003D | PLA (100%) | 40.54276 | 17.02796 |
| 2 (comparison) | PLA6302D | PLA (100%) | 31.98146 | 15.99073 |
| 3 | PLA2003D-PC | PLA (60%) PC (40%) | 18.14087 | 6.89353 |
| 4 | PLA6302D-PC | PLA (60%) PC (40%) | 19.52274 | 9.76137 |
| 5 | PLA2003D-PC40-CA-GTA | PLA (55%) PC (40%) CA (0.5%) GTA (2.5%) | 10.05887 | 5.029434 |
| 7 | PLA6302D-PC40-CA-GTA | PLA (57%) PC (40%) CA (0.5%) GTA (2.5%) | 10.23678 | 5.067206 |
| 8 | PLA6302D-PC50-CA-GTA | PLA (46%) PC (50%) CA (0.4%) GTA (3.6%) | 5.91174 | 3.07410 |

A 40-80% decrease in the oxygen permeability was observed in the biocomposites with respect to pure PLA indicating that the incorporation of paper according to this invention process greatly enhances the oxygen barrier properties of the materials.

Example 9

Heat Resistance

The heat resistance was evaluated in terms of deformation of the dog-bone shaped samples after immersion in water at 90° C.

TABLE 6

| # | Material | Composition (wt %) | Heat Resistance at 90° C. | Effect at 90° C. in water |
|---|---|---|---|---|
| 1 (comparison) | PLA2003D | PLA (100%) | No | It deforms |
| 3 | PLA2003D-SIL | PLA (60%)<br>SIL (40%) | Yes | — |
| 4 (comparison) | PLA6302D | PLA (100%) | No | It deforms |
| 5 | PLA6302D-PC50-CA-GTA | PLA (46%)<br>PC (50%)<br>CA (0.4%)<br>GTA (3.6%) | Yes | — |
| 6 | PLA6302D-PC60-CA-GTA | PLA (36%)<br>PC (60%)<br>CA (0.3%)<br>GTA (3.7%) | Yes | — |
| 7 | PLA6302D-PC-PEG | PLA (50%)<br>PC(40%)<br>PEG (10%) | Yes | — |
| 8 | PLA2003D-PC50-CA-CO-CW | PLA (44.5%)<br>PC (50%)<br>CA (0.5%)<br>CO (2.5%)<br>CW (2.5%) | Yes | — |
| 9 | PLA2003D-PC40-CA-MW | PLA (56.5%)<br>PC (40%)<br>CA (0.5%)<br>MW (3%) | Yes | — |

The present biocomposites do not bend or deform upon immersion in hot water, thus showing a great improvement with respect to the poor heat resistance of PLA alone.

Example 10

Biodegradability

Biodegradability of the present biocomposites was evaluated through a standard biochemical oxygen demand (BOD) test, by measuring the amount of oxygen consumed during a biodegradation. 200 mg of each sample pellets were immersed in 432 mL bottles containing seawater. The oxygen consumption was monitored for 30 days by the sealed OxyTop caps on each bottle. BOD from blank bottles filled with only seawater was also measured for reference.

TABLE 7

| # | Material | Composition (wt %) | $BOD_{30}$ (mg/l) | Degradation onset (days) |
|---|---|---|---|---|
| 1 (comparison) | PLA6302D | PLA (100%) | 0 | — |
| 2 | PLA6302D-PC | PLA (60%)<br>PC (40%) | 9.5 | 13 |
| 3 | PLA6302D-PC-CA-GTA | PLA (57.5%)<br>PC (40%)<br>CA (0.5%)<br>GTA (2.5%) | 8.2 | 13 |
| 4 (comparison) | PC | PC (100%) | 10.8 | 10 |

As shown in Table 7, PLA alone did not undergo biodegradation whereas for the present composites of the invention (nos. 2 and 3 in Table 7 above) the BOD values and the onset of degradation were similar to those found for pure paper indicating the excellent biodegradability and faster biodegradation rate due to the incorporation of paper.

Example 11

Comparative Tests—Evaluation of the Effect of Fillers

The effect that fillers could have in formulations such as the present ones, was evaluated in experiments described herein below, in order to achieve comparative data with prior art such as WO2019/055921, disclosing materials made of cellulose pulp fibers and fillers dispersed in a thermoplastic polymer matrix. By the term "fillers" is meant fiber glasses, minerals (such as mica, talc, clay, basalt, calcium carbonate and wollastonite), polymers with a higher melting point than that of the thermoplastic matrix (such as polyvinyl alcohol and nylon) and lignocellulosic materials.

According to WO2019/055921, when glass fibres are used as fillers, their amount should be at least 2% by weight. For other fillers, no indication of their content is provided. The composite material of WO2019/055921 might include one or more additives selected from the group of lubricants, acid scavengers, compatibilizers, coupling agents and impact modifiers. In certain embodiments, the composite materials comprise no more than 2% by weight of additives. In others, no more than 20% by weight of additives.

Starting from the same formulations of Table 1 above, the formulations in Table 8 below were prepared by physically mixing the materials indicated, and by subsequently feeding the obtained mixtures to a twin-screw extruder. The processing conditions were T=165-170° C., screw speed=300 rpm for formulations 1-7 and T=135-145° C., screw speed=300 rpm for formulation 8. The extruded pellets were further processed by injection moulding at 155-160° C. to obtain dogbone shaped specimens. The formulations 1 and 2 in Table 8 are part of this invention, while the other are comparison formulations, comprised in the scope of the claims in WO2019/055921.

TABLE 8

| # | Sample name | Polymer Matrix | Cellulose Fibers | Filler | Additives |
|---|---|---|---|---|---|
| 1 | PLA2003D/PC-20-GTA-CA-BW | Polylactic acid (PLA) (73% wt) | Paper capsules (PC) (20% wt) | — | Glycerol triacetate (GTA) (4% wt) Citric acid (CA) (0.5% wt) Bio-based wax (BW) (2.5% wt) |
| 2 | PLA2003D/PC-30-GTA-CA-BW | PLA (63% wt) | PC (30% wt) | — | GTA (4% wt) CA (0.5% wt) BW (2.5% wt) |
| 3 (comparison) | PLA2003D/PC-20-GTA-CA-BW-PVA | PLA (68% wt) | PC (20% wt) | Polyvinyl alcohol (PVA) (5% wt) | GTA (4% wt) CA (0.5% wt) BW (2.5% wt) |
| 4 (comparison) | PLA2003D/PC-20-GTA-CA-BW-GF | PLA (68% wt) | PC (20% wt) | Glass fibres (GF) (5% wt) | GTA (4% wt) CA (0.5% wt) BW (2.5% wt) |
| 5 (comparison) | PLA2003D/PC-20-GTA-CA-BW-CL1 | PLA (68% wt) | PC (20% wt) | Montmorillonite Clay (CL1) (5% wt) | GTA (4% wt) CA (0.5% wt) BW (2.5% wt) |
| 6 (comparison) | PLA2003D/PC-20-GTA-CA-CL1 | PLA 2003D (78% wt) | PC (20% wt) | CL1 (0.5% wt) | GTA (1% wt) CA (0.5% wt) |
| 7 (comparison) | PLA2003D/PC-20-GTA-CA-CL2 | PLA 2003D (78% wt) | PC (20% wt) | Bentonite Clay (CL2) (0.5% wt) | GTA (1% wt) CA (0.5% wt) |
| 8 (comparison) | PLA6302D/PC-20-GTA-CA-CL1 | PLA 6302D (78% wt) | PC (20% wt) | CL1 (0.5% wt) | GTA (1% wt) CA (0.5% wt) |

The formulations 1 and 2 of the present invention, in which the filler is not present, exhibited a good processability by extrusion. The obtained pellets and dog-bones are light-coloured and homogeneous (FIG. 12*a, b*).

On the contrary, the comparison formulations 3 and 4 were not suitable for extrusion due to the agglomeration induced either by the PVA or by the glass fibres fillers respectively, as shown in FIG. 13*a, b*. No material could be collected by extrusion of the comparison formulation 3, whereas only a few grams of dark-coloured pellets could be produced using formulation 4 (see FIG. 13*c*).

The comparison formulations 5-8 in Table 8 above, containing different amounts of clay fillers, could be extruded and further processed through injection moulding. However, the colour of the resulting pellets and dog-bones appeared much darker than the samples without fillers, possibly due to degradation (FIG. 14*a-d*). Such effects were observed both at relatively low (0.5% wt) and high (5% wt) clay (CL) concentration and for both types of clay, for different processing temperatures (135-145 and 165-170° C.) and when a different amount of additives from 2 to 7% by weight were used.

In the following Table 9 the mechanical properties of injection moulded dog-bone shaped specimens are summarised for the invention formulations 1 and 2, and for the comparison formulations 5-8 containing fillers.

TABLE 9

| # | Sample name | Young's Modulus (MPa) | UTS (MPa) | Elongation at break (%) |
|---|---|---|---|---|
| 1 | PLA2003D/PC-20-GTA-CA-BW | 1687 ± 62 | 46 ± 0.6 | 7 ± 1.0 |
| 2 | PLA2003D/PC-30-GTA-CA-BW | 1721 ± 66 | 48 ± 0.7 | 6.5 ± 0.5 |
| 5 (comparison) | PLA2003D/PC-20-GTA-CA-BW-CL1 | 1527 ± 73 | 40 ± 0.7 | 16 ± 6.0 |
| 6 (comparison) | PLA2003D/PC-20-GTA-CA-CL1 | 1546 ± 35 | 46 ± 0.9 | 7.9 ± 2.0 |

TABLE 9-continued

| # | Sample name | Young's Modulus (MPa) | UTS (MPa) | Elongation at break (%) |
|---|---|---|---|---|
| 7 (comparison) | PLA2003D/PC-20-GTA-CA-CL2 | 1441 ± 107 | 50 ± 1.5 | 6.7 ± 2.0 |
| 8 (comparison) | PLA6302D/PC-20-GTA-CA-CL1 | 1465 ± 34 | 44 ± 1.3 | 7.7 ± 1.2 |

As shown in Table 9, the incorporation of clays even in amount of 0.5% by weight dramatically affected the Young's modulus of the materials. The ultimate tensile strength (UTS) and elongation at break did not significantly change with respect to the composites without clay of the invention, but the higher standard deviations for comparison formulations indicate that the cellulose and the fillers are not homogeneously dispersed. This effect was more evident with a clay content of 5% by weight, in which the standard deviation of the elongation at break reached a value of ±6. Moreover, in the said composite, the UTS and the Young's modulus decreased by 15% and ~9% respectively compared to the same formulation without clay according to the invention. On top of that, the comparison samples with clays also appeared less homogeneous and exhibited lower mechanical properties with respect to the invention specimens with a higher loading of cellulose fibres (30% by weight).

These results demonstrate that the incorporation of fillers in the PLA/PC composites negatively impacts the melt processing of the materials upon extrusion, the dispersion of the components in the thermoplastic blends, the colour and the mechanical properties of the resulting composites.

Example 12

Comparative Tests—Evaluation of the Effect of Drying Before Extrusion

Two formulations have been prepared containing PLA 2003D, paper capsules (PC), citric acid (CA), glycerol triacetate (GTA) and a biobased wax (BW) in the following proportions respectively 53.5%, 40%, 0.5%, 3% and 3% by weight. These mixtures were dried at 50° C. Prior to the extrusion, 4.7% by weight of water was added to one formulation only, so that the exact amount of moisture in the sample was known, whereas the other one was kept dry. The extrusion was performed at 165-170° C. with a screw speed of 300 rpm. The injection moulding was performed at 160° C. The samples dried before the extrusion appeared light-coloured and the extrusion process was continuous (FIG. 15*a*). Conversely, the darker coloration of both extruded pellets and dog bones in presence of moisture (FIG. 15*b*) indicates that degradation processes occurred during extrusion. Moreover, the moisture favoured the formation of bubbles that increased the pressure at the die and rendered the extrusion process not continuous.

In the following Table 10 the mechanical properties are reported for the injection moulded dog-bones for the samples dried before extrusion and for the samples containing 4.7% by weight of moisture (moist)

TABLE 10

| Formulation | Young's Modulus (MPa) | Ultimate tensile strength UTS (MPa) | Elongation at break (%) |
|---|---|---|---|
| PLA-PC-GTA-CA-BW dry | 1849 ± 48 | 53 ± 0.8 | 4.6 ± 0.5 |
| PLA-PC-GTA-CA-BW moist | 1858 ± 100 | 50 ± 2 | 4 ± 0.5 |

The decrease in the mechanical properties coupled to higher standard deviations in the moist samples compared to the dry samples prepared according to the invention process, indicate a less homogenous distribution of cellulose in the material and a limited reinforcing effect possibly ascribed to degradation phenomena occurring in the presence of moisture in the extruder.

Example 13

Comparative Tests—Evaluation of the Effect of Using Capsules Instead of Micro-Ground Materials on Mechanical Properties of the Composites Composites based on PLA3052D and millimetric capsules according to this invention have been prepared, as well as composites based on PLA4032D and micro-ground paper according to what disclosed in the state of the art (WO2015/048589), and composites based on PLA and cellulose fibres derived from newspaper and Kraft paper described in the state of the art by Huda et al. [3]. In parallel the respective pure PLAs have been tested too. In the following Table 11 the mechanical properties found for the tested products are reported, also indicating the percentage variation in the composites with respect to the pure PLA.

The so obtained results have shown for the PLA composites prepared according to the state of the art citation WO2015/048589 and containing 30% of micro-ground paper a 25% improvement of the Young's modulus with respect to the corresponding pure PLA but a worsening of 9.6% and of 60% respectively in the ultimate tensile strength (UTS) and in the elongation at break. Moreover, always in Table 11, results are reported showing how for the composites of the state of the art represented by Huda et al. [3] and containing cellulose microfibres TC1004, the ultimate tensile strength is significantly lower for the composites than for the corresponding pure PLA, of 24.8% and of 37.3% respectively, and also than the composites of this invention containing the same amount of cellulose load in the form of millimetric capsules. For these composites containing cellulose fibres a very high Young's modulus was also measured that would render any material made with such composite extremely rigid, and therefore unsuitable as replacement for plastic materials. Also, the elongation at break measured for these composites with respect to pure PLA is far worse than that measured for the present composites.

In fact, for the composites prepared by the process of this invention and containing 30% by weight of paper millimetric capsules a 30% improvement in the Young's modulus was observed, a 1.6% improvement in the ultimate tensile strength and a lowering of the elongation at break of only 27.6% with respect to the pure PLA. These properties are definitely better than those shown by the composites of the state of the art, also when the paper load is much higher. For example in the composite containing 50% by weight of the paper millimetric capsules of the invention the Young's modulus increases by 44%, the ultimate tensile strength by 10% and the elongation at break changes to a 50% decrease with respect to the pure PLA, with much better general mechanical performances.

TABLE 11

| Formulation | Young's Modulus(MPa) | Ultimate Tensile Strength (MPa) | Elongation at break (%) |
|---|---|---|---|
| PLA 3052D | 1350 ± 28 | 60 ± 0.7 | 8 ± 0.7 |
| PLA3052D + 30% PC | 1753 ± 58<br>+29.8% | 61 ± 1.1<br>+1.7% | 5.8 ± 1<br>−27.5% |
| PLA3052D + 40% PC | 1870 ± 100<br>+38.5% | 55 ± 2<br>−8.3% | 4 ± 2<br>−50% |
| PLA3052D + 50% PC | 1950 ± 100<br>+44.4% | 66 ± 1<br>+10.0% | 4 ± 1<br>−50.0% |
| PLA4032D pure (comparison) | 2757.9 | 71.7 | 5 |
| PLA4032 D + 30% micro-ground paper (comparison) | 3447.4<br>+25.0% | 64.8<br>−9.6% | 2<br>−60.0% |
| PLA pure (comparison) | 2700 ± 400 | 62.9 ± 4.9 | 40 |
| PLA + 30% TC 1004 (comparison) | 6300 ± 400<br>+133.3% | 47.3 ± 2.5<br>−24.8% | 10<br>−75.0% |
| PLA + 40% TC 1004 (comparison) | 6800 ± 300<br>+151.8 | 39.4 ± 5.3<br>−37.4% | — |

Example 14

Comparative Tests—Evaluation of the Effect of Using Capsules Instead of Micro-Ground Materials on Thermal Properties of the Composites Composites based on PLA3052D and millimetric capsules according to this invention have been prepared, as well as composites based on PLA and cellulose fibres derived from newspaper and Kraft paper as described in the state of the art by Huda et al. [3]. In parallel the respective pure PLAs have been tested too. In the following Table 12 the results of a thermogravimetric analysis carried out on these tested materials are reported, also indicating the percentage variation in the composites with respect to the pure PLA besides the value found. In particular, in the following Table 12 the $T_{25}$, $T_{50}$ and $T_{75}$ temperatures are reported, i.e. the temperatures at which 25%, 50% and 75% of loss of weight of the tested material was observed.

The tested composites of this invention having a content of millimetric capsules of 30%, 40% and 50% by weight, all show a decrease lower than 5% in the $T_{25}$, $T_{50}$ and $T_{75}$ values with respect to the pure PLA and a similar variation is also shown for the paper capsules not processed with PLA, this being an indication that the capsules undergo negligible transformations in the process of this invention. The thermal degradation shown on the contrary by the composites known in the state of the art, containing cellulose microfibres, is significantly higher than that of pure PLA, until reaching 14% of variation in the $T_{75}$ temperature value for the composites having a 30% load of cellulose fibres. Such high thermal degradation is not found in the starting cellulose fibres not processed with PLA according to the method described in the state of the art. Without wanting to be bound to a theory, inventors consider that cellulose fibres are negatively affected by the long times of processing fibres and by the high temperatures taught by the authors of [3].

TABLE 12

| Formulation | $T_{25}$ (° C.) | $T_{50}$ (° C.) | $T_{75}$ (° C.) |
|---|---|---|---|
| PLA 3052D | 347.5 | 358.2 | 366.2 |
| PLA3052D + 30% PC | 334 | 344.3 | 353.3 |
| | −3.9% | −3.9% | −3.5% |
| PLA3052D + 40% PC | 330.5 | 340.5 | 350 |
| | −4.9% | −4.9% | −4.4% |
| PLA3052D + 50% PC | 330.5 | 341.8 | 353.9 |
| | −4.9% | −4.6% | −3.3% |
| PC | 334 | 352 | 364 |
| PLA (comparison) | 365 | 401 | 414 |
| PLA + 30% TC 1004 | 336 | 349 | 356 |
| (comparison) | −7.9% | −13% | −14% |
| TC 1004 (comparison) | 305 | 330 | 348 |

The present invention has been described above with reference to its preferred embodiments, but further embodiments may exist, all comprised in a same inventive core, as defined by the scope of the attached claims.

BIBLIOGRAPHIC REFERENCES

[1] M. Pracella, M. M. U. Haque, M. Paci, V. Alvarez, Property tuning of poly(lactic acid)/cellulose bio-composites through blending with modified ethylene-vinyl acetate copolymer, *Carbohydrate Polymers,* 2016, 137, 515-524.

[2] E. Fortunati, D. Puglia, J. M. Kenny, M. M. Hague, M. Pracella, Effect of ethylene-co-vinyl acetate-glycidyl-methacrylate and cellulose microfibers on the thermal, rheological and biodegradation properties of poly(lactic acid) based systems, *Polymer Degradation and Stability,* 2013, 98, 2742-2751.

[3] M. S. Huda, A. K. Mohanty, L. T. Drzal, E. Schut, M. Misra, "Green" composites from recycled cellulose and poly (lactic acid): Physico-mechanical and morphological properties evaluation, *Journal of materials science,* 2005, 40, 4221-4229.

[4] J. M. Raquez, Y. Habibi, M. Murariu, P. Dubois, Polylactide (PLA)-based nanocomposites, *Progress in Polymer Science,* 2013, 38, 1504-1542.

[5] M. Le Billif, K. Oksman, The Effect of Processing on Fiber Dispersion, Fiber Length, and Thermal Degradation of Bleached Sulfite Cellulose Fiber Polypropylene Composites, *Journal of Thermoplastic Composite Materials,* 2009, 22, 115-133.

[6] M. Le Billif, A. Echtermeyer, Effect of the Preparation of Cellulose Pellets on the Dispersion of Cellulose Fibers Into Polypropylene Matrix During Extrusion, *Journal of applied polymer science,* 2010, 115, 2794-2805.

[7] M. Hietala, K. Oksman, Pelletized cellulose fibres used in twin-screw extrusion for biocomposite manufacturing: Fibre breakage and dispersion, Composites Part A, 2018, 109, 538-545.

[8] N. Volk, R. He, K. Magniez, Enhanced homogeneity and interfacial compatibility in melt-extruded cellulose nano-fibers reinforced polyethylene via surface adsorption of poly (ethylene glycol)-block-poly (ethylene) amphiphiles. *European Polymer Journal,* 2015, 72, 270-281.

The invention claimed is:

1. A process for the preparation of a biodegradable composite comprising a thermoplastic polymer material and a cellulosic material, and optionally one or more additives, said process comprising:

i) producing cellulosic material in the form of compressed capsules in a single step by compression in a punching machine of cellulosic materials in the form of sheets and foils, said compressed capsules having millimetric size from 850 micrometers to 8 millimeters and being the same size, thickness and shape;

ii) providing a) the cellulosic material in the form of compressed capsules, said capsules being optionally pre-treated with one or more additives, and b) a thermoplastic polymer material, and drying the cellulosic material in the form of compressed capsules and thermoplastic material to remove moisture;

iii) mixing said dried cellulosic material in the form of compressed capsules and the dried thermoplastic polymer material, to form a dried mixture wherein said cellulosic material is at least 30% by weight with respect to the total weight of the mixture; and iv) melt extruding the mixture of step iii) at a temperature ranging from 130 to 1700 and forming extruded strands of said biodegradable composite.

2. The process of claim 1, wherein said capsules have a diameter of 3 mm and a height of 1 mm.

3. The process of claim 1, further comprising a step of pelletizing said extruded strands of biodegradable composite, and of optionally moulding the so obtained pellets by injection or compression moulding at a temperature ranging from 140 to 170° C. to obtain said biodegradable composite in the form of a shaped article.

4. The process of claim 1, wherein said drying is carried out at a temperature of between 40 and 70° C. for a time of between 8 and 48 hours.

5. The process of claim 4, wherein said drying is carried out at a temperature of 50° C. for a time of 12 hours.

6. The process of claim 1, wherein the amount of said dried cellulosic material is between 40 and 60% by weight with respect to the total weight of the mixture.

7. The process of claim 1, wherein the amount of said dried thermoplastic polymer material ranges from 35 to 70% by weight with respect to the total weight of said mixture.

8. The process of claim 1, wherein said cellulosic material is selected from pure paper, wastepaper, recycled paper, coated paper, cardboard, vegetable leaves, fruit pulp, fruit skin, coffee shells, platano banana pulp, and pet food.

9. The process of claim 1, wherein said thermoplastic polymer material is selected from the group consisting of D-polylactic acid, L-polylactic acid, D,L-polylactic acid, meso-polylactic acid, and combinations thereof, optionally in combination with one or more polyesters selected from polybutilenesuccinate (PBS), polyhydroxyalkanoates (PHAs), polycaprolactone (PCL), poly(DL-lactide-co-glycolide) (PGLA), poly(dioxanone) (PDO), poly(hydroxybutyrate-co-hydroxyvalerate) (PHBV), poly(1,4-butyleneadipate) (PBA), poly(butadiene adipate co-terephthalate) (PBAT), poly(ethylene carbonate) (PEC), poly(propylene carbonate) (PPC) and mixtures thereof, and/or with thermoplastic starches, polyethylene oxides, polyurethanes, polyolefins and mixtures thereof.

10. The process according to claim 1, wherein the amount of said one or more dried additives ranges from 0.1 to 15% by weight with respect to the total weight of said mixture.

11. The process of claim 1, wherein said one or more additives is selected from non-toxic natural and/or food contact approved plasticizers, lubricants, rheology modifiers, stabilizers, colorants, processing aids, brighteners, anti-oxidants, and mixtures thereof.

12. The process of claim 11, wherein said one or more additives are selected from compounds bearing carboxylic, hydroxylic and ester moieties.

13. The process of claim 1, wherein said melt extrusion in step iii) is carried out at a temperature ranging from 135 to 165° C.

14. The process of claim 3, wherein said moulding is performed at a temperature ranging from 145 to 165° C.

15. The process of claim 1, wherein said compressed capsules are obtained by compression between plates of a punching machine of said cellulosic material in the form of sheets or strips.

16. The process of claim 6, wherein the amount of said dried cellulosic material is between 40 and 50% by weight, with respect to the total weight of the mixture.

17. The process of claim 7, wherein the amount of said dried thermoplastic polymer material ranges from 35 to 55% by weight with respect to the total weight of said mixture.

18. The process of claim 10, wherein the amount of said one or more dried additives ranges from 0.5 to 5% by weight with respect to the total weight of the mixture.

* * * * *